(12) United States Patent
Dewey et al.

(10) Patent No.: US 12,019,498 B2
(45) Date of Patent: Jun. 25, 2024

(54) CORE OFF SLEEP MODE WITH LOW EXIT LATENCY

(71) Applicant: NVIDIA Corporation, Santa Clara, CA (US)

(72) Inventors: Thomas E. Dewey, Menlo Park, CA (US); Narayan Kulshrestha, Fremont, CA (US); Ramachandiran V, Bangalore (IN); Sachin Idgunji, San Jose, CA (US); Lordson Yue, Los Altos, CA (US)

(73) Assignee: NVIDIA CORPORATION, Santa Clara, CA (US)

( * ) Notice: Subject to any disclaimer, the term of this patent is extended or adjusted under 35 U.S.C. 154(b) by 68 days.

(21) Appl. No.: 16/175,232

(22) Filed: Oct. 30, 2018

(65) Prior Publication Data

US 2019/0163255 A1 May 30, 2019

Related U.S. Application Data

(60) Provisional application No. 62/592,977, filed on Nov. 30, 2017.

(51) Int. Cl.
*G06F 1/32* (2019.01)
*G06F 1/3234* (2019.01)
*G06F 1/3287* (2019.01)
*G06F 1/3296* (2019.01)
*G06F 13/42* (2006.01)
*G06F 15/78* (2006.01)
*G06T 1/20* (2006.01)
*G06T 15/00* (2011.01)

(52) U.S. Cl.
CPC .......... *G06F 1/3287* (2013.01); *G06F 1/3243* (2013.01); *G06F 1/3278* (2013.01); *G06F 1/3296* (2013.01); *G06F 13/4221* (2013.01); *G06F 15/7807* (2013.01); *G06T 1/20* (2013.01); *G06T 15/005* (2013.01); *G06F 2213/0026* (2013.01)

(58) Field of Classification Search
None
See application file for complete search history.

(56) References Cited

U.S. PATENT DOCUMENTS

| | | | |
|---|---|---|---|
| 7,256,788 B1 * | 8/2007 | Luu | G06T 1/20 345/501 |
| 8,924,752 B1 * | 12/2014 | Law | G06F 1/3287 713/322 |
| 9,035,956 B1 * | 5/2015 | Schreyer | G06T 1/60 345/502 |
| 9,390,461 B1 * | 7/2016 | Jane | G06F 1/3246 |
| 10,187,061 B1 * | 1/2019 | Venugopal | H03K 19/0013 |

(Continued)

*Primary Examiner* — Jaweed A Abbaszadeh
*Assistant Examiner* — Cheri L Harrington
(74) *Attorney, Agent, or Firm* — Nixon & Vanderhye, PC

(57) ABSTRACT

An optimized power saving technique is described for a processor, such as, for example, a graphic processing unit (GPU), which includes one or more processing cores and at least one data link interface. According to the technique, the processor is operable in a low power mode in which power to the at least one processing core is off and power to the at least one data link interface is on. This technique provides reduced exit latencies compared to currently available approaches in which the core power is turned off.

35 Claims, 17 Drawing Sheets

(56) References Cited

U.S. PATENT DOCUMENTS

| | | | |
|---|---|---|---|
| 10,627,886 B2* | 4/2020 | Leucht-Roth | G06F 1/3287 |
| 10,852,811 B2 | 12/2020 | Idgunji | |
| 2010/0007646 A1* | 1/2010 | Tsuei | G06F 1/3203 |
| | | | 345/212 |
| 2010/0330927 A1* | 12/2010 | Cherukuri | G06F 1/3287 |
| | | | 455/68 |
| 2011/0060928 A1* | 3/2011 | Khodorkovsky | G06F 1/325 |
| | | | 713/323 |
| 2012/0249559 A1* | 10/2012 | Khodorkovsky | G06F 1/3275 |
| | | | 345/502 |
| 2013/0021352 A1* | 1/2013 | Wyatt | G09G 5/395 |
| | | | 345/520 |
| 2013/0063450 A1* | 3/2013 | Kabawala | G06F 9/5044 |
| | | | 345/502 |
| 2014/0101468 A1* | 4/2014 | Narayanan | G06F 1/266 |
| | | | 713/320 |
| 2014/0125680 A1* | 5/2014 | Saulters | G09G 5/363 |
| | | | 345/502 |
| 2015/0134985 A1* | 5/2015 | Gopal | G06F 1/3287 |
| | | | 713/320 |
| 2015/0170315 A1* | 6/2015 | Samson | G06T 1/20 |
| | | | 345/502 |
| 2015/0205344 A1* | 7/2015 | Diefenbaugh | G06F 1/3246 |
| | | | 713/320 |
| 2015/0241949 A1* | 8/2015 | Varma | G06F 1/206 |
| | | | 713/320 |
| 2016/0109925 A1* | 4/2016 | Diefenbaugh | G06F 1/3287 |
| | | | 713/320 |
| 2018/0129261 A1* | 5/2018 | Garg | G06F 9/4418 |

\* cited by examiner

CORE OFF SLEEP MODE WITH LOW EXIT LATENCY

CROSS-REFERENCE TO RELATED APPLICATIONS

This application claims the benefit of priority from U.S. Provisional Application No. 62/592,977 filed on Nov. 30, 2017, the entire contents of which is hereby incorporated by reference.

FIELD

This technology relates to power saving in computer systems, and more particularly to reducing power consumed by a processor of a computer system. Still more particularly, an aspect relates to powering off a graphic processing unit (GPU) core in a sleep mode but leaving interfaces to one or more high speed links powered on in the sleep mode so that the GPU can quickly exit the sleep mode.

BACKGROUND AND SUMMARY

The reduction of power consumed by computer systems and various other electronic devices is an issue of considerable interest to many users and computer manufacturers. Users of battery-powered electronic devices realize the benefits of improved power savings in terms of extended battery lifetimes without having to recharge. Users of other electronic devices may reap the benefits of improved power savings in terms of the reduced costs associated with consumed power. Considering the collective power savings of the vast number of electronic devices in use, the benefits to the environment too can be significant.

Currently, many techniques exist where processors in computer systems or other electronic devices are transitioned to a low power state when the system detects an extended period of inactivity. A processor in a computer system is said to be "idle" during time intervals in which, although the computer system is powered on, the processor remains inactive without engaging in processing activity. Different power savings techniques may be applied based on the length (or the expected length) of the duration in which the processor remains idle. The processor may become idle at any time while the computer system is powered on, including after operating system boot, after completing an active workload, or after resuming from low power mode.

In the low power mode, the processor has some of its functions disabled or turned off in order to reduce the amount of power consumed. Low power modes are sometimes referred to as "sleep modes" or "sleep states". A processor enters a "sleep mode" automatically after a period of inactivity or by manual selection. A computer with capability to enter sleep mode can "wake up" in response to network connections or a signal from user interface devices. It is desirable that the exit latency, which is the time from initiation of the wake event to the processor becoming fully operational, is short so the sleep mode does not adversely affect functionality and in user-interactive systems, the user experience is not detrimentally affected.

Sleep states are sometimes referred to as "C-states" (core states) with respect to CPUs, with C0 denoting the full operation mode (normal operation mode) of the CPU and C1 and higher (e.g., C1-C11) referring power saving modes yielding increasing amounts of power savings by turning off more and more processing circuits. With respect to GPUs, sleep states are sometimes referred to as "GC-states" in certain GPU's from NVIDIA Corporation. GC0 represents the normal operation mode of the GPU and GC6 currently saves the most power.

Some currently available computer systems provide multiple sleep states that are differentiated by the amount of power saved and/or what functions of a processor are powered down and disabled. Although current techniques of putting a processor in a sleep state yield lower power consumption, sometimes the time to subsequently reactivate (also referred to as "wake" or "wakeup") the computer system upon receiving an input from a user or other source is too long and may interfere with the usability of the computer system.

In general, a tradeoff exists between the amount of power reduced in an idle state and the amount of exit latency to resume normal operation. For long idle conditions, it is desirable to dissipate as little power as possible. Regulatory bodies such as CEC™, EStar™, Euro™, etc. require computer manufacturers to comply with aggressive idle power budgets. In order to meet such low power targets, component manufacturers often choose to power down all non-essential functions while maintaining power to only enough circuitry to detect a wake up event and quickly resume normal operations.

With each generation of a graphics processing unit (GPU) having increased complexity and capability, the idle power in the core(s) (also referred to as "processing cores") of the GPU is usually found to be the biggest part of power consumption. Because more and more processing circuitry is being included in GPU cores, GPU core power consumption has been increasing at a faster rate than the idle power of other components of the GPU. NVIDIA Corp. has previously introduced, in some GPUs, a feature (e.g., a feature referred to as "GC6") that reduces idle power consumption by powering off the entire GPU with the exception of a small "always on" island (a part of the GPU chip) that detects wake events and performs some chip initialization upon wakeup. Although GC6 and other current sleep modes are effective at power saving, the lengthy time intervals (e.g., 50 milliseconds or greater, 100 milliseconds etc.) required for reactivating the processor can detrimentally affect the usability of such sleep modes in some use cases. For example, if the exit (from sleep state) latency associated with exiting a sleep mode is beyond what is considered a time threshold for user perception of interactivity, that sleep state will be entered infrequently so as not to detrimentally affect the user experience. On the other hand, if the exit latency is within the time threshold for user perception of interactivity, the sleep mode may be entered more frequently without risking deterioration of the user experience.

The approach provided by example non-limiting embodiments herein enhances power savings in idle processors while ensuring low latency reactivation from sleep mode.

BRIEF DESCRIPTION OF THE DRAWINGS

The following detailed description of exemplary non-limiting illustrative embodiments is to be read in conjunction with the drawings of which.

DETAILED DESCRIPTION OF NON-LIMITING EXAMPLE EMBODIMENTS

Figure 1:
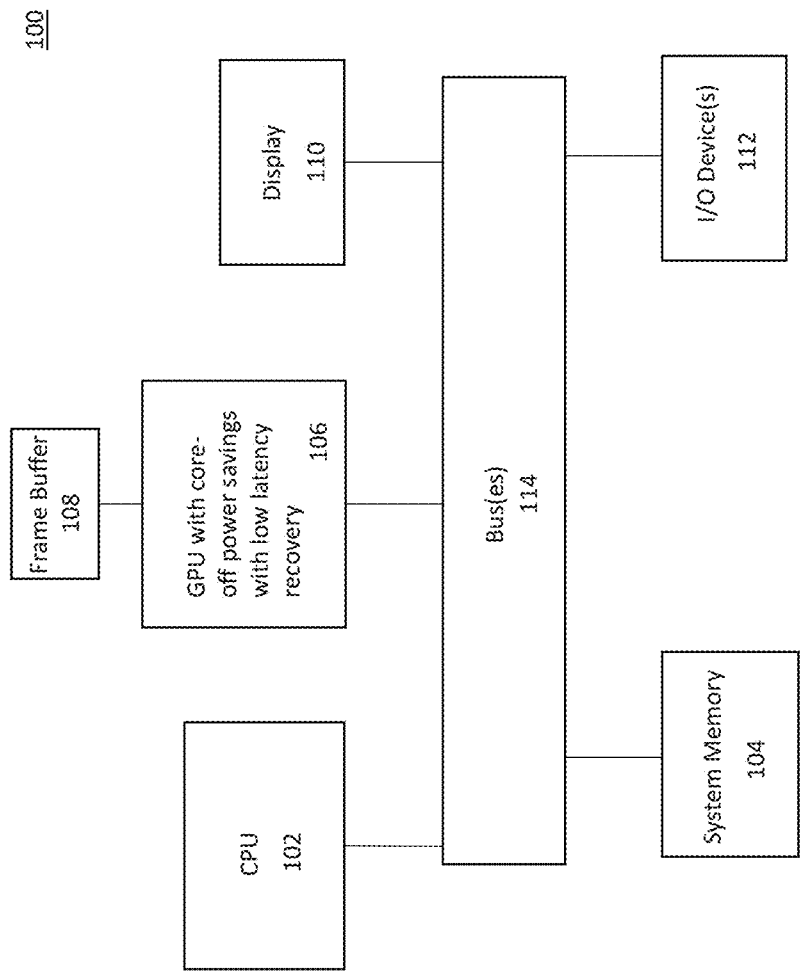
FIG. 1 is a block diagram of an example non-limiting embodiment of a computer system.

Example embodiments provide for reducing power consumed by a processor in an idle state, in a manner that enables quick reactivation of the processor. The reactivation of the processor, in certain example embodiments involving a GPU, is performed with such low latency that improved power savings are obtained by putting the GPU into a sleep mode with the core(s) powered off in between interactive display events such as, for example, successive blinks of a cursor on a display, successive keyboard strokes, and other user-perceivable events. The capability to turn the core(s) off and back on again for such short durations between frequently occurring events (e.g., flashes of the cursor) may provide for achieving significantly reduced power consumption than currently available techniques, without detrimentally affecting the user experience. The events in between which a GPU can be put into a sleep mode according to example embodiments are not limited to interactive events, and may also include GPU computation events that are not interactive.

Even when a processor is idle and is thus not consuming dynamic power (power consumed by processing activity), the processor core consumes static power. This static power consumption is referred to as leakage, and results in the loss of multiple watts even when a processor is not actively processing. Previous power saving techniques have reduced this leakage by turning power off to the entire processor in a sleep mode while only leaving a small always on portion of the circuitry powered on. These previous approaches, however, while successful at reducing leakage, sometimes result in long wake up latencies. Embodiments disclosed herein improve upon these previous approaches by implementing techniques to reduce the wake up latency while still also reducing leakage.

The time for a GPU to exit a sleep mode and resume normal operations is often dominated by the data link interface wake up time, i.e. the time it takes for the external interfaces of the GPU to restart, reinitialize and resume operations. An idea implemented in example embodiments is to optimize the chip space so that the idle power benefits dominated by core off logic is retained whereas the wake up time from idle to active is sped up.

Example embodiments address the limitations of conventional core off sleep modes (i.e., conventional sleep modes in which the processor core is powered off) by having a power state that is comparable to GC6 mode power savings but with significantly lower (i.e., faster) exit latency. Previous approaches often required custom implementations and/or custom software which limit the rate of adoption, e.g. such as by being applicable to only custom notebook designs. In contrast to these previous approaches, some embodiments disclosed herein can be deployed on both notebook computers and desktop and other platforms and require little to no custom hardware and/or software design in other parts of the computer system, but instead rely on industry standard protocols.

The exit latencies of example embodiments are greatly reduced as compared to the exit latencies for the GC6 mode, thus making it feasible to deploy embodiments in new use cases such as self-refresh panels, GSYNC/NVSR (NVIDIA Self Refresh) panels, and possibly video applications.

The short exit latencies offered in sleep modes according to embodiments also allow systems, such as those with SLI (NVIDIA's Scalable Link Interface™), to both meet energy regulations targets and improve energy consumption and battery life in SLI systems. The sleep modes can be extended to non-SLI multi-GPU compute applications as well where idle GPUs (or over-provisioned GPUs) can transition to a sleep mode with fast wake up to allow for loads to scale without affecting, or only minimally affecting, the response times for work execution.

GPUs according to certain example embodiments may be compliant with energy regulation requirements such as CEC™, Euro™, and EnergyStar™, for desktop, notebook, and SLI systems. Embodiments may also enable GSYNC/NVSR panels to significantly extend battery life without any visual and/or latency artifacts. For example, MobileMark™ benchmarks on certain example embodiments project a 30-50% system battery life improvement.

It is expected that the improved usability and improved battery life provided by certain example embodiments will help NVSR/GSYNC adoption. Embodiments also extend the power usage effectiveness (PUE) of multi-GPU based server systems in warehouse or large scale computing arms by effectively allowing idle power mitigation with fast wakeup.

Overall Example Block Diagram

FIG. 1 illustrates a computer system 100 which implements a core off sleep mode with low exit latencies according to certain example embodiments. Computer system 100 may represent a notebook computer, server computer, tablet computer, desktop computer, or any other electronic device which includes a central processing unit (CPU) and a GPU. Other embodiments may have a GPU but no CPU, or a CPU but no GPU, or may have multiple CPUs and/or GPUs. Computer system 100 is configured to be operable to run applications while at least one of its processors (e.g., CPU and/or GPU) transitions in and out of a sleep mode in a manner that is transparent to the user, so that the improved power savings is achieved without significantly affecting the user's experience of interactivity. For example, although the GPU may enter the sleep mode in between even such short duration (e.g., half second to one second) interactive events such as the blinks of a cursor or keyboard strokes, the user may not observe any delay in successive cursor blinks or the system's responsiveness to successive keystrokes. That is, example embodiments ensure a fast response time for a display update to occur in response to a user input received or other events such as cursor blink rate even when a processor enters a "core off" sleep mode between such events. Even when the GPU is used for real-time applications that do not necessarily have either an interactive component or other display component, some example embodiments may enable the GPU enter the sleep mode to save power. That is, the example embodiments provide exit latencies that are shorter than a user's perception of interactivity (e.g., 30-35 ms). Some example embodiments ensure exit latencies as low as 20 ms or even 10 ms.

Computer system 100 includes a CPU 102, a system memory 104, a GPU 106, a frame buffer 108 connected to the GPU 106, a display 110, at least one input/output device (I/O device) 112 and interconnections (e.g. buses) 114 that interconnect the various components of the computer system 100.

CPU 102 may include, for example, a commercially available CPU or other custom processor. The CPU, in some example embodiments, is primarily responsible for executing applications and overall control of the computer system 100. The CPU may include a single processing core or more than one processing core (a "multi-core" CPU). In some embodiments, system 100 may include more than one CPU.

System memory 104 may comprise a random access memory (RAM) such as dynamic RAM (DRAM), DDRAM or the like that provides for storage of instructions and data during the running of applications for access by the CPU 102 and/or other components of the system. Although not separately shown, computer system 100 may also include one or more persistent memories.

GPU 106 includes the capability to turn off power to its one or more cores in a sleep mode while still being able to transition out of the sleep mode and into a fully operational mode with low latency. This capability is further described throughout this application.

GPU 106 may process and render images for display on display 110. In some embodiments, GPU 106 may perform other types of processing such as applications or portions of applications. In some embodiments, GPU 106 may be used to execute compute-intensive applications or portions of applications, or applications with parallel processing. In some cases, GPU 106 may execute a display list generated by the CPU 102 and/or stored in memory 104 to generate images to be rendered on display 110. Data mining applications, weather predictions, neural networks, deep learning applications etc. are some example applications which may be performed wholly or in part in the GPU but may or may not involve a display of images.

GPU 106 may include one or more processing cores. Certain example GPUs include hundreds or thousands of processing cores on the same chip. Although a GPU has many different types of circuitry (e.g., input/output interfaces, control circuitry etc.) on a single chip, the most intensive data processing tasks are typically performed in the processing cores. Although only a single GPU 106 is shown in system 100, it will be understood that any number of GPUs can be included in system 100.

In order to implement the core off sleep mode with power saving capabilities according to embodiments, GPU 106 includes features such as multiple power domains, the capability to latch and clamp state between power domains, and intelligent reset control. GPU 106 is further described with respect to FIGS. 3-10 below.

Frame buffer 108 is a dynamic memory that is directly connected to the GPU 106, and serves to store interim outputs and outputs of the GPU 106. In certain example embodiments, frame buffer 108 is used to store the state of the GPU cores before they are powered off during sleep modes so the GPU core(s) can quickly recover its/their previous state(s) upon waking up.

Display 110 can display images rendered by GPU 106 and/or other output from CPU 102. Display 110 may comprise one display or multiple displays. The multiple displays may be the same or different in terms of display types, formats and/or resolutions.

I/O device 112 includes one or more input devices such as keyboard, mouse, hard disk, etc.

Interconnections or interfaces (labeled "bus") 114 includes one or more buses (also referred to as "data links") such as, for example, PCI Express (PCIE), NVLINK, USB, Thunderbolt, PCI, IDE, AGP etc. Interconnections 114 provide interconnectivity between, CPU 102, GPU 106, system memory 104, display 110, I/O devices 112 and any other devices attached thereto including devices external to system 100. Interconnections 114 may include buses of the same or different speeds, capacities and/or communication/transmission protocols. For example, high speed buses such as, PCIE, NVLINK, USB-C, Thunderbolt and the like, may connect the CPU and one or more GPUs to each other and/or to system memory, while slower buses, such as, PCI, IDE or the like, provide connectivity to less speed critical peripherals, I/O devices etc.

Although not separately shown, interconnections 114 may, in some embodiments, include a PCIE bus connecting CPU 102 and GPU 106, and/or an NVLINK bus connecting GPU 106 to another GPU. In some embodiments, CPU 102 and GPU 106 may be connected by a NVLINK bus. In some embodiments, interconnections 114 may include a separate, direct, connection between GPU 106 and display 110. Although not separately shown, in some example embodiments, buses 114 may include any of one or more network interfaces (e.g., Ethernet, etc.) connecting the computer system 100 to an external network, and peripheral devices (e.g., specialized displays, audio/video encoders, storage devices, etc.).

Latency Issues Associated with Data Interfaces

Many modern data links 114 including but not limited to PCIE, NVLINK and advanced USB standards achieve higher speeds by adapting communications to the condition of the physical link as well as to the capabilities of both senders and the receivers. Specifically, when a data link is first powered on, the entities on each side of the link typically enter an initialization/discovery mode to discover the condition of the link, what other entities are present on the link, and what communications capabilities those other entities have. Through such discovery (also known as "training" since the communications circuits are exercised and each end trains the other on how to communicate), communicating entities can optimize their communications to the condition of the link and the respective capabilities of other communicating entities on the link.

As an example, the PCIE standard specifies a state machine that defines the various states each PCIE device must transition through in order to establish a link and begin communicating data. The device starts with detect and transitions to polling, configuration, and subsequent equalization recovery states wherein both sides of the link advertise their capabilities. A back-and-forth handshaking allows the devices on each end of the link to negotiate a number of link parameters including lane polarity, link/lane numbers, equalization, data rate, and so on. The entities on the link can begin communicating data only once they complete negotiations and agree on communication parameters they will each use to communicate with the other.

Such training procedures can be involved and hence time-consuming. If the link circuits are powered off and back on again during power saving mode, this can cause the circuits to reset/restart which means they need to be retrained. Retraining can introduce significant time delays between the instant power is reapplied to the circuits and the instant when the circuits are ready to communicate.

Perhaps the easiest way to avoid such retraining delays is to keep the communication circuits powered on. However, the communications circuits are often merely an interface between other devices such as between a processor core and another processor core, a processor core and a memory, etc. If the processor core(s) and memory are powered off or enter a reduced power or sleep state, their connections with the communications circuits can become undefined. This can lead to the communications circuits sending spurious data over the link. Accordingly, some embodiments herein provide mechanisms to prevent the temporary sleep state of a processor core or memory from presenting undefined data states to active communications circuits.

It will be understood that computer system 100 is an example of a computer system configured to implement the core off sleep mode according to certain example embodiments. Some embodiments, may include more of less of the components shown in FIG. 1, and/or may include different components (e.g., additional and/or different volatile memories, persistent memories, input/output devices, display devices, accelerators, sensors etc.).

As noted above, according to some embodiments, the illustrated computer system 100 may be a notebook computer, desktop computer, server computer and the like, with its own display and I/O devices. Alternatively, in some example embodiments, computer system 100 may not include a display and/or an I/O device, and instead may include one or more interfaces to displays and/or I/O devices. For example, in some embodiments, GPU 106 with core off sleep capability may be incorporated in a system on a chip (SoC) with at least one CPU and/or one or more other GPUs.

Conventional Power Savings Features

Figure 2:
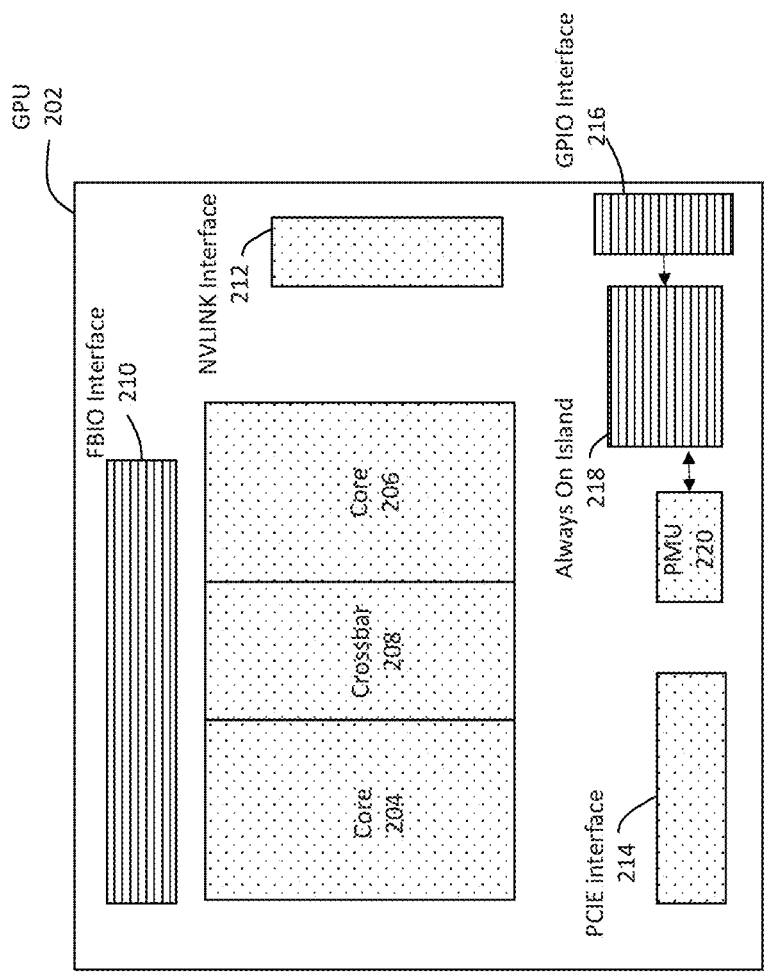
FIG. 2 illustrates aspects of a conventional graphics processing unit (GPU) in sleep mode.

FIG. 2 illustrates aspects of a GPU 202 which implements a conventional power saving technique. According to the conventional technique, in the sleep mode, GPU 202 powers off all components of the GPU except for the frame buffer interface 210, the general purpose I/O interface 216 and a small always on logic block 218. The always on island 218 and the GPIO interface 216 are kept powered on so that wake requests can be received and acted upon. The always-on island that detects wake events and performs as much chip initialization as possible until the high speed link interfaces of the GPU have been restored to normal operational link state. The frame buffer input/output (FBIO) interface 210 is kept powered on so that the frame buffer can be maintained.

GPU 202, as illustrated in FIG. 2, is in the sleep mode. The powered off components are shown in a dotted fill pattern while the powered on components are shown in a lined fill pattern. As illustrated, all cores (cores 204 and 206), the core interconnection crossbar 208, host interfaces to high speed links (PCIE interface 214 and NVLINK interface 212), and the power management unit (PMU) 220 are all powered off during certain sleep modes. The GPU 202 sleep mode illustrates the GPU in GC6 sleep mode as implemented in some NVIDIA Corp. GPUs. Turning off the GPU core power in the conventional technique also turned off the high speed IO core (the high speed link interfaces 212 and 214) as well. The voltage to the high speed link interfaces (e.g., PEXVDD voltage) that include the PCIE interface 214 and the NVLINK interface 212 is turned off, and thus the PCIE and NVLINK interfaces is put in an L3 (i.e. Link Disable) state.

As described above, this conventional technique successfully reduces power leakage by turning off power to the cores. However, the exit latency is too long for many use cases.

One of the key bottlenecks of exit latency in the GC6 mode is the restoration of high speed link interfaces such as PCIE from L3 state or NVLINK from L3 state. These L3 states are often engaged by removing the supply to the interfaces (PCIE/NVLINK), powering them down to achieve zero standby power. For example, PCIE L3 to L0 link power mode takes around 15 ms to retrain, while NVLINK L3/L0 can take up to 500 ms/link in worst cases. Such link retraining times are a significant percentage of the current GC6 mode exit latency requirement of 45 ms.

This long exit latency limits when such low power modes as GC6 can be employed. For example, Microsoft Corp.'s ModernStandby™ and NVIDIA's self-refresh feature NVSR™ require short latencies so as to not affect user experience. This in turn affects the idle mode entry threshold to engage GC6, which leads to lower residency in GC6 mode, higher power consumption, and thus reduced battery life. In the case of NVSR, studies have shown that user experience is significantly impacted if the exit latency exceeds 30 ms. This impact is so significant that the idle threshold must be increased from 70 ms to as much as 10 sec to ensure the user does not experience frame stuttering and mouse lag in several common applications such as Excel spreadsheet of Web Browsing. Alternatively, instead of the higher levels of power saving modes, software may be used to fall back to the lowest acceptable power state thereby largely eliminating the power benefits of NVSR.

Example System with Improved Sleep State Exit Latency

Figure 3:
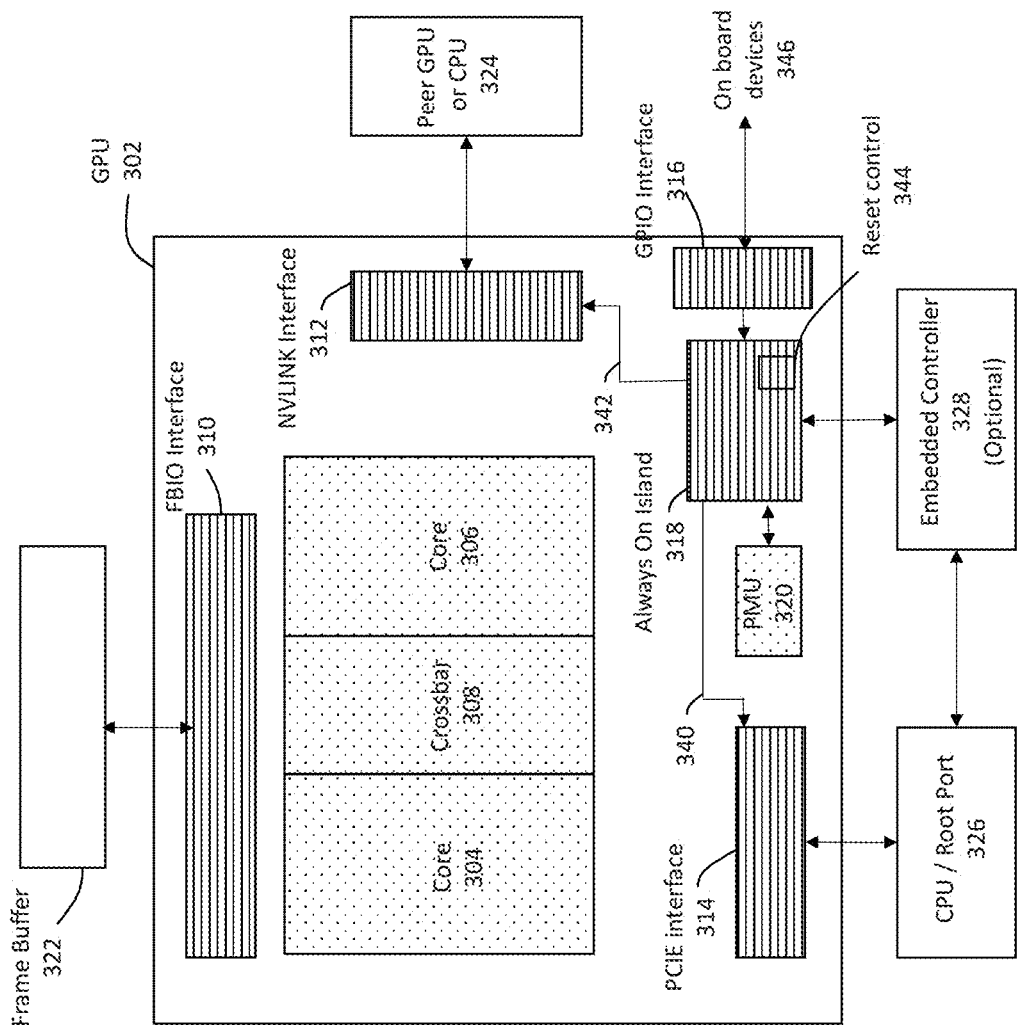
FIG. 3 illustrates aspects of a GPU sleep mode according to certain example embodiments.

FIG. 3 is a block diagram of an example non-limiting GPU 302 that implements a core off sleep mode power saving technique according to certain example embodiments, and some connected components according to certain embodiments. GPU 302 may be an example of GPU 106 shown in FIG. 1. GPU 302 is configured to include the capability to turn off power to its one or more cores in a sleep mode while still being able to transition out of the core off sleep mode and into a fully operational mode with low latency.

GPU 302 includes two graphics cores (GPCs) 304 and 306 connected via an interconnect 308. GPCs 304 and 306 may be configured to operate on the same or different applications and/or data, and includes the processing circuitry of the GPU 302. Although for illustrative purposes only two cores (304 and 306) are shown, GPU 106 may include hundreds or thousands of processing cores. Interconnect 308 may include a crossbar or other interconnection that allow the processing cores to communicate with each other.

Additionally, GPU 302 includes a FBIO 310 that enables communication with a frame buffer 322 for storing and retrieving data and/or images. FBIO 310 may be a dedicated interface between the frame buffer and GPU 302 to provide high speed and efficient data transfer from/to the frame buffer. Moreover, GPU 302 also includes one or more high speed link interfaces (also referred to as "high speed bus interface") such as, for example, a PCIE interface 314 and a NVLINK interface 312. PCIE interface 314 enables the GPU 302 to communicate over a PCIE bus. NVLINK interface 312 enables the GPU 302 to communicate over a NVLINK bus. GPU 302 may communicate with another GPU or a CPU over the NVLINK interface 312, and/or with a CPU or root port (e.g., a root port connecting the CPU, GPU and system memory to a PCIE switch fabric) over the PCIE interface 314.

A GPIO interface 316 may connect the GPU to one or more on board devices 346.

A PMU 320 enables many of the power management functions of the GPU 302. For example, PMU 320 may implement at least some of the functions by which the low power mode is provided in the GPU 302.

An always-on island 318 includes logic such as sequence control logic for the GPU and is configured to remain powered on at all times when the computer system in which GPU 302 exists is turned on. The always-on island 318 is connected to the GPIO 316 and PMU 320. In some embodiments, although it would add to the amount of idle power consumed, PMU 320 may remain powered on during low power mode in order to further reduce exit latency. The always-on island can control the mode where the PMU 320 is kept on or powered down, thus allowing for opportunities to improve overall idle power management.

Of course, GPU 302 may include additional circuitry than that individually shown in FIG. 3. For example, certain embodiments may include one or more of a video ROM, a thermal monitoring circuit, configuration registers, voltage regulator, fan, video encoder/decoder, audio encoder/decoder, interconnections between components on the same chip, etc.

GPU 302, in FIG. 3, is shown in a core off sleep mode. As in FIG. 2, FIG. 3 also illustrates the powered off components of the GPU 302 in a dotted fill pattern, and the powered on components in a line fill pattern. In contrast to the conventional GPU 202 shown in FIG. 2, GPU 302 in FIG. 3 maintains the high speed link interfaces in powered on mode while the GPU cores are powered off. In contrast to the sleep mode in conventional GPU 202, in example embodiments the high speed links remain powered on and isolated from the core, and the PCIE link and NVLINK interfaces are in powered on but less than full power link modes (e.g., PCIE link is in L1 and the NVLINKs are in L2). That is, in the core off sleep mode, GPU 302 powers off all its processing cores but keeps power on to its high speed links while putting them in a lower than full power mode. When in full power operation mode, the GPU 302 may have all its processing cores powered on and its high speed link interfaces at full power.

GPU 302 may include multiple power domains with the high speed link interfaces being in a separate power domain from the core so that the core and the high speed links can be separately power controlled. According to embodiments, the multiple power domains may include 1-2 domains for processing logic (e.g., cores etc.) and 3-4 domains for I/O logic (e.g., high speed link interfaces, frame buffer interface, etc.). An example, power domain layout for GPU 302 is shown in FIG. 4.

Power Domains in Example Processor

Figure 4:
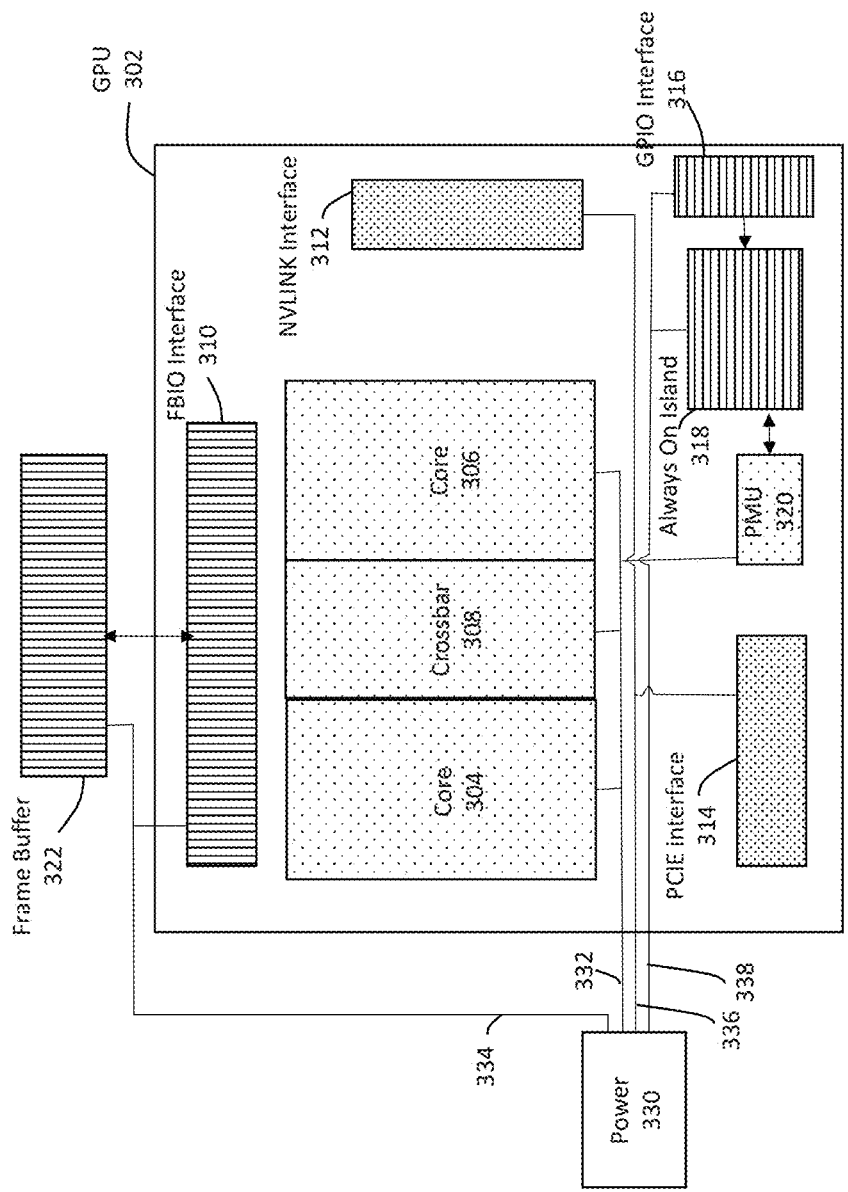
FIG. 4 is a block diagram of an example non-limiting GPU illustrating power domains.

FIG. 4 illustrates GPU 302 with 4 separate power domains. The multiple power domains as laid out in FIG. 4 allow some power domains to be turned off, while leaving the others being powered on. As illustrated in FIG. 4, GPU 302 may have separate power domains as follows: a core power domain encompassing the GPCs 304 and 306 and crossbar 308, a frame buffer power domain encompassing the FBIO interface 310 and frame buffer 322, a high speed link power domain encompassing one or more high speed link interfaces 312 and 314 (NVLINK interface 312 and PCIE interface 314), and an always-on power domain encompassing the always-on island 318 and the GPIO interface 316. In some embodiments, the PMU 320 may be included in the core power domain. Each power domain is supplied by a different power rail. Power rails 332, 334, 336 and 338 supply the core power domain, the frame buffer power domain, the high speed link interface power domain, and the always on power domain, respectively.

Each power domain may further be subdivided into one or more power islands. For example, the core power domain may have each of its cores in a separate power island. Each power island may comprise of circuitry that can be power gated, so that, for example, each core can be individually power gated while the power rail for the core domain is turned on. It should be noted that power gating a core can result in more leakage than turning off the power rail to that core.

FIG. 4 illustrates all the power rails of the GPU being powered from the same power source 330. However, in certain example embodiments, the rails may be powered by multiple different power sources.

In the example embodiments, the core power domain is turned off while keeping the frame buffer power domain and the high speed link power domains powered on. When the core is powered down, the frame buffer may be in self-refresh mode so that it can retain the core state.

The majority of GPU idle power is consumed by the leakage from the cores. This is minimized in example embodiments by reducing rail gating the core power domain as is done in GC6 mode. As described above, if the high speed link interfaces such as PCIE, NVLINK are also powered down as in GC6 mode, then the exit latency can be prohibitively high for critical use case scenarios such as energy regulations compliance, ModernStandby™, and NVSR/GSYNC self-refresh panels.

In some example embodiments, several techniques are employed in order to overcome the shortcomings of GC6 mode with respect to certain use cases. In example embodiments, all the cores are powered off, but the high speed link interfaces remain powered up. The high speed link interfaces are put into low power idle state, and thus are able to resume normal operation very quickly.

In the core off sleep mode of some example embodiments, the PCIE interface is in L1 link power mode, and the NVLINK is in L2 link power mode. A PCI Express link in full operation is referred to be in L0 link power mode. In L1, the link is quiescent (i.e., no data being transferred) and power is reduced, but the link can relatively quickly resume full operation. An L2 link power mode is logically equivalent to the L3 link power mode with the exception that in L2 the PHY is in IDDQ/power gated state and the power supply to logic controlling the PHY is powered up but in reduced power state. In L3 the link is disabled and powered off. L0-L3 may be referred to as "link power modes". With the high speed links in these states, the exit latencies are on the order of 100 us and 500 us, respectively. This compares to 15 ms and 500 ms/link, respectively, in GC6.

In order to achieve the above, example embodiments may clamp the interfaces between the cores and the high speed link interface power domains, because the core power is turned off. Level shifter clamps or the like may be used for this purpose.

The PCIE and NVLINK interfaces may trigger a retraining sequence if inputs from the core change values. To avoid this, example embodiments may include a latch after each level shifter clamp to maintain the previous values until they are restored during exit. Clamp and latch enable signals 340 and 342 in FIG. 3 between the always on island 318 and respective high speed link interfaces 312 and 314 are configured to enable/disable latch and clamp circuitry that maintains link state and isolates the high speed link interfaces from the core power domain.

Link State Retention in Example Processor

Figure 5B:
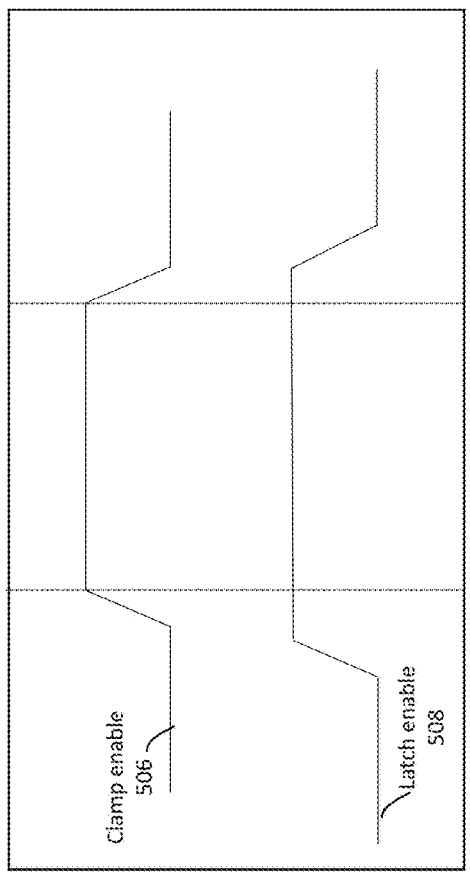
FIG. 5B illustrates the timing relationship between enabling clamping and latching, according to some example embodiments.
Figure 5A:
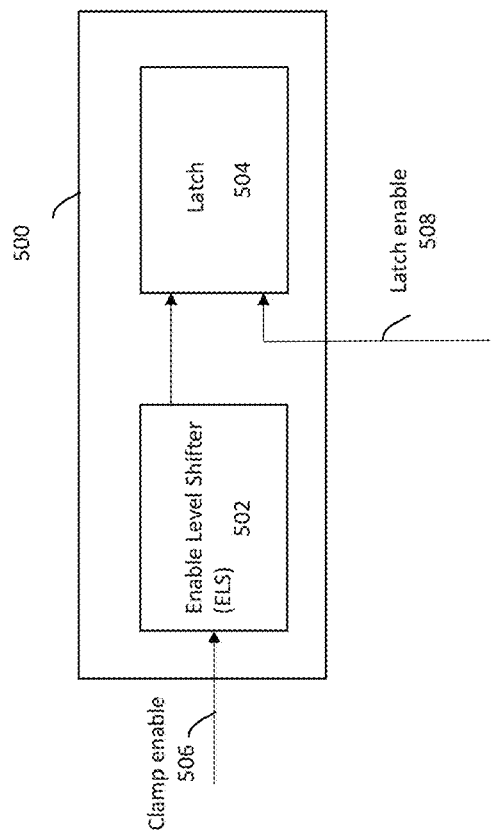
FIG. 5A shows a block diagram of clamping and latching logic according to some example embodiments.

FIG. 5A illustrates a block diagram of an example clamp and latch circuit 500. Circuit 500 may be included in the high speed link rail (e.g., 336) or in each of the high speed link interfaces (e.g., 312 and 314). Circuit 500 includes an enable level shifter (ELS) 502 for clamping the signal and a latch 504 for retaining the signal value. A clamp enable signal 506 is provided to the ELS 502 to enable the clamping, and a latch enable signal is provided to latch 504 to enable the latching. Generally speaking, the clamping function clamps the signal level to a particular signal value, whereas the latching function latches (stores) the current signal value in a memory storage circuit (a latch) so that it is retained.

As shown in FIG. 3 signals 340 and 342 from the always-on island, the clamp enable and latch enable signals may be provided by sequence control circuitry in the always-on island. The circuit 500 may be provided at specific crossings between the core power domain and the high speed link power domain for each signal to be retained as part of the link state. In some example embodiments, about 500 such signals may be clamped and latched (e.g., about 287 XP signals and about 210 XVE signals for PCIE).

FIG. 5B illustrates the timing of clamping and latching. As illustrated, the latching is enabled before the clamping is enabled, and is released after the clamping is released. The motivation is to maintain the link state to avoid or minimize retraining. A latch is used because the polarity of the clamped signal may not be fixed in the clamped state, and therefore example embodiments retain the previous data values. The timing is determined so as to latch first to hold the previous value, and then to safely clamp the interface. The unclamping can be done safely by releasing the latch when the latch is still holding the data. This sequence is performed in example embodiments when clocks entering the high speed links are gated.

To exit this core off sleep mode without the presence of any clocks, in some example embodiments, the PCIE root port 326 may trigger an L1/L0 transition by disabling L1 link power mode via an Advanced Configuration and Power Interface (ACPI) call. This may trigger activity on the PCIE link that is detected by an idle state monitor/idle entry filter (e.g., an rx_state_idle detector). With this approach, example embodiments are not limited by the read completion requirement (currently 2 ms) to PCIE config space access when the link is in L1.

In order to further save dynamic power, some example embodiments may gate all clocks on the GPU. This requires a CPU-initiated exit detection mechanism that does not rely on link clocks. Here embodiments may rely on activity detection by the idle state monitor.

To additionally save leakage power in these domains, embodiments may reduce the operating voltage to the point where the state can reliably retain integrity but reduce leakage due to the higher cost of operating voltage in functional mode.

Example embodiments also allow optimization of the link states for PCIE and NVLINK independently depending on the requirements of a particular use case. For example, the PCIE can be in L1 or L2, while at the same time the NVLINK can be either in L1 or L2 as well.

Moreover, example embodiments preserve the logical state of the PCIE configuration state, and this allows the CPU to access this state without requiring a lengthy save/restore sequence before such an access can be serviced.

Reset control circuitry 344 may be provided in the always-on island 318. The reset control circuitry enables resetting of individual power domains and/or circuitry in the GPU without affecting other power domains. For example, the reset control circuitry is configured to reset the core power domain upon wakeup, without affecting the link states retained from before the sleep mode was entered. Such reset control circuitry for example ensures that the core when powered up again produces outputs to the interface circuitry that initially match the latched/clamp values so no state transitions occur when the clamping and latching enable signals are released . . . .

Figure 6:
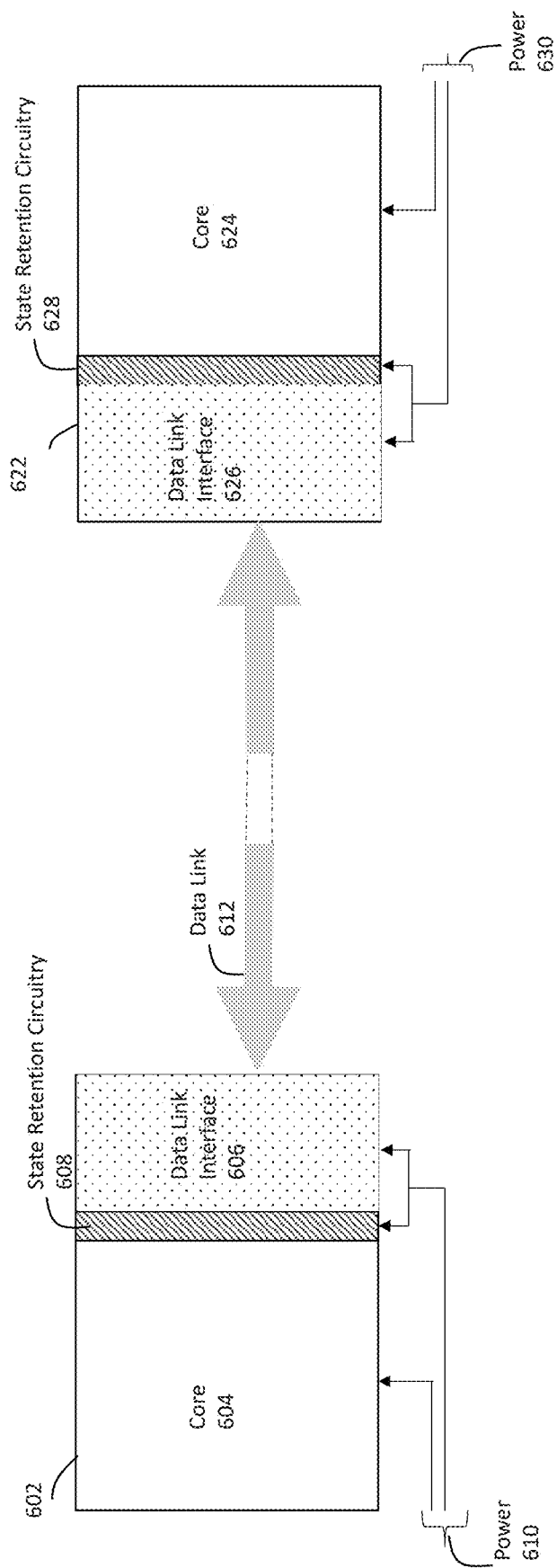
FIG. 6 illustrates a block diagram of a system with processors with circuitry to retain link state, according to some example embodiments.

FIG. 6 illustrates a block diagram of a plurality of processor cores in a computer system, according to some example embodiments. The system 600 includes at least two processor cores 602 and 622 connected by a data link 612. Processor core 602 may be a GPU such as, for example, GPU 106. Processor core 604 may connect to data link interface circuitry 606 through which it connects to the data link 612. Core 604 and data link interface 606 may be powered by separate power rails from the same or different power sources 610.

Data link 612 may include one or more of the interconnections 114, 312 and 314 (e.g., PCIE, NVLINK, USB-C, etc.) described above. Data link 612 may connect processor 602 to another processor 622 which may also be a GPU such as, for example, GPU 106 described above. Data link 612 may also provide connectivity to a display (not shown) and/or other device.

When the system is fully operational, processor 602 may render a sequence of images to a display connected via data link 112. For example, core 604 may perform processing and rendering of the images which are transmitted to the display via the data link interface 606.

When processor core 604 is in the core-off sleep mode, according to example embodiments, core 604 is powered off and data link interface 606 remains powered on albeit in a lower power link mode than the normal operating link mode. Core 604 may be powered off by turning off the power to the rail supply power to it. The rail supplying power to data link circuitry 606 remains powered on.

As described above, example embodiments enable the processor core 604 to transition in and out of the sleep mode in between processing events, such as, for example, displaying successive blinks of a cursor on the display, updating the display in accordance with successive input key strokes, etc.

Transitioning out of (i.e. waking up from) the sleep mode includes powering on core 604 and putting data link 606 in the normal operating link mode. In order to reduce the time consumed for retraining etc., of the data link upon waking up, the link states are retained in state retention circuitry 608 before processor 602 transitions into sleep mode. That is, the state of the data link 612 immediately before data link interface 612 is put in the lower power link mode is retained.

During transitioning from the sleep mode to the full operational mode, the core 604 is powered on and the retained link state (in circuitry 608) is used to either eliminate or reduce the time required for the retraining the data link 612 in order to put it back in fully operational link power mode.

State retention circuitry 608 may include clamping and latching circuitry such as that described in relation to FIGS. 5A and 5B, and may be powered by the same power rail that supplies data link interface circuitry 606. State retention circuitry 608 thus enables processor core 604 to transition out of the sleep mode with little or no retraining of the link, thus achieving significant savings in the latency required to wake up and begin operating in full operational mode. State retention circuitry 608 isolates the data link interface 606 from core 604, such that, the changes to the core power mode do not affect the data link 612. When processor core 604 is in the sleep mode, the core is powered off, and the powered on state retention circuitry 608 makes the data link interface circuitry 606 immune to the power state of the core (in other words, the state retention circuitry 608 that may include latches, clamping circuits and intelligent reset circuitry) isolates the data link interface 606 from the effects of the core 604 powering off and powering back on again. When the processor core 604 is again in full operational mode, state retention circuitry 608 may become transparent to the communication between the core 604 and data link interface circuitry 606.

Processor 622 may be a processor identical to or different from processor 602. For example, in some embodiments processor 622 may be a GPU with a core 624, data link interface 626, state retention circuitry 628 and power management circuitry 630 that are similar to core 604, data link interface 606, state retention circuitry 608 and power management circuitry 610 of processor 602. In some other embodiments it may be another type of processor, such as, for example, a CPU. According to example embodiments, the transitioning of processor 602 occurs independently. That is, there may be no coordination (e.g., exchange of synchronization signals, or instruction received from another processor) between processor 602 and another processor before processor 602 transitions to a sleep mode.

Example Logic Components for Sleep Mode with Low Latency Exit

Figure 7:
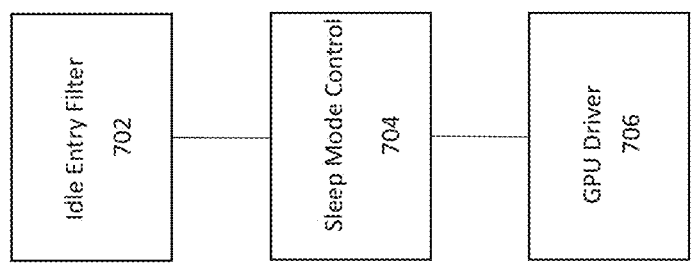
FIG. 7 shows a block diagram of some logic components for implementing a sleep mode according to some example embodiments.

FIG. 7 shows a block diagram of some logic components for implementing the core off sleep mode according to some example embodiments.

The idle entry filter 702 performs monitoring in order to determine idle intervals and whether to trigger the GPU to enter into the low power mode. The idle entry filter 702 logic may include a combination of software, firmware and/or hardware and may be implemented by the CPU and/or the GPU.

The sleep state control 704 includes logic to determine whether to trigger entry to and exit from the low power mode. Sleep state control 704, in combination with the idle entry filter 702, may monitor how much and what parts of the GPU are being actively utilized. This identified information may then be used to determine what parts of the GPU can be powered off to save power.

Sleep state control 704 and idle entry filter 702 may operate to detect predetermined durations of inactivity of the GPU or portion thereof. Upon detection of such predetermined durations of inactivity (for example, based on PCIE activity, core activity etc.), a determination may be made to enter a core off sleep state. The particular core off sleep state selected may be based upon the detected duration of inactivity. The deeper sleep states save more power, but can result in longer reactivation times. The longer reactivation times may be a result of more components having to be reinitialized after having been powered down. Because of the longer reactivation times involved, the decision to enter the GPU to a deep sleep state is required to be made accurately.

The GPU driver 706 includes logic to implement GPU configurations for entering into and exiting from the core off sleep mode.

Figure 8:
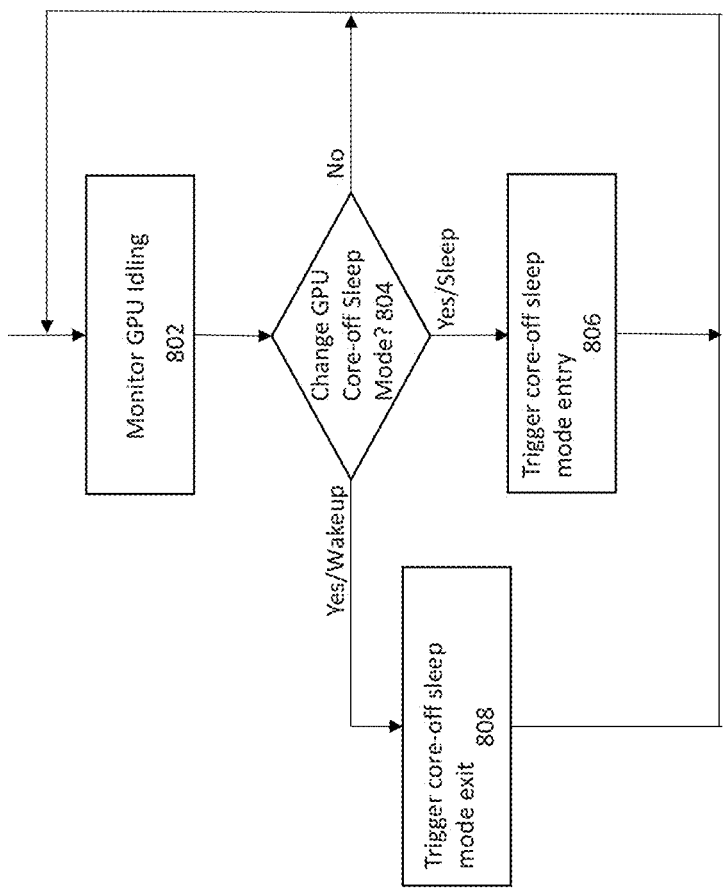
FIG. 8 illustrates a process for detecting whether to put a processor in sleep mode according to some example embodiments.

FIG. 8 illustrates a process 800 for detecting whether to put a processor in the core off sleep mode, according to some example embodiments. In an example embodiment, process 800 may monitor the GPU in order to put the GPU in a power saving mode when permitted by system conditions.

Determining Entry into Sleep Mode

Process 800 may occur in parallel with other processing in the computer system. For example, the other processing that occur in parallel with process 800 (and/or in parallel with processed 900 and 1000 described below) may include an application being run on the CPU and some application related processing such as the rendering of images resulting from the application being processed by the GPU.

After entering the process 800, at operation 802, the idle time for the GPU is monitored. The monitoring may be based on any one or more of PCIE activity, NVLINK activity, GPU core activity and CPU activity. For example, idle time may measure time in which any of the PCIE link, NVLINK link, GPU cores, and/or CPU remains inactive.

At operation 804 it is determined whether the GPU should enter the core off sleep mode. This determination may be based upon the idle time measured alone, or in combination with other aspects such as, for example, the previous one or more user inputs and/or CPU instructions.

If it is decided at operation 804 that no change of the sleep mode is necessary, then process 800 returns to operation 802 to continue to monitor idle time.

If it is decided at operation 804 that the GPU should be entered into the core off sleep mode, then at operation 806, the core off sleep mode is triggered.

In some example embodiments, process 800 may also monitor for events to exit from the core off sleep mode. For example, at operation 802, monitoring may include monitoring for wake events.

If a wake event is received, and it is determined at operation 804 that the GPU is to be reactivated to normal operation mode, then at operation 708, the GPU is triggered to perform exit from the core off sleep mode.

Example Process for Entering Sleep Mode

Figure 9:
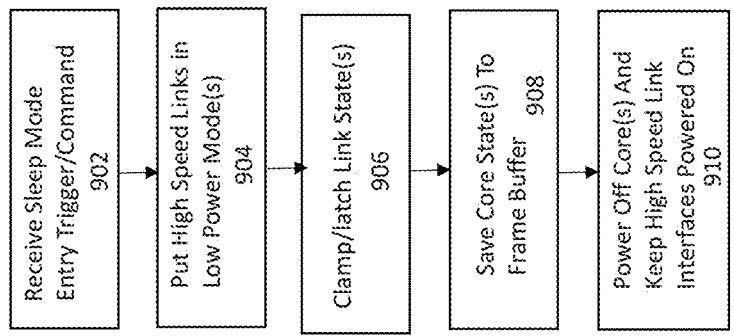
FIG. 9 illustrates a process for putting a processor in sleep mode according to some example embodiments.

FIG. 9 illustrates a process 900 for transitioning a processor in a sleep mode according to some example embodiments. Process 900 may be used, for example, to transition a GPU, such as GPU 106 described above from a fully operational mode to a sleep mode in which the core is powered off but high speed link interfaces remain powered on.

At operation 902, the trigger and/or command to enter the sleep state is received by a sleep sequence control logic in the processor that is to be transitioned to the sleep state. In some other embodiments, the logic to transition the processor may reside outside that processor. The trigger may be generated from a process such as process 800 described above. The trigger may include information as to the particular sleep mode to transition to, or such information may be available to process 900 by other means (e.g., configuration).

At operation 904, in accordance with the particular sleep mode to be transitioned to, the high speed links are put into a lower power mode. For example, the high speed links that are currently fully operational in L0 power mode, are put into a lower power L1, L2 or L3 link power modes.

In an example default sleep mode according to example embodiments, the PCIE interface may be put in a L1 link power mode, and the NVLINK in an L2 link power mode. This may be used, for example, when a highly latency sensitive NVSR panel is driven by the GPU.

In scenarios where the PCIE latency is not critical, but NVLINK latency must still be short, such as in long idle scenarios but without an attached NVSR panel, the PCIE link may be put in L2 while keeping the PEX rail (e.g., rail 336) on to yield additional power savings.

Some scenarios, such as CEC with SLI (Long Idle)—which is less latency sensitive, may allow for the PCIE interface to be in L2, while having the NVLINK interface in L3 (RM Init) even with 500 ms/link if no save/restore (serial).

In scenarios such as CEC with SLI (Short Idle), which is more latency sensitive than the SLI long idle described above, the PCIE interface may be put in L1 and NVLINK in L2 yielding about 2 ms/link to fully activate.

At operation 906, the link states of the high speed link interfaces are clamped and latched. In addition to achieving electrical isolation, clamping is also desirable for functional reasons. Clamping, for example, may be necessary to preserve link states of the high speed links before the core is powered off. A latch may be used to preserve the previous state.

In order to ensure that the state is preserved to the previous saved state, embodiments may implement an intelligent circuit on top of the clamps. In effect, the intelligent circuit is to ensure that the high speed links stay back in the previous state.

A goal of example embodiments is to make the core being powered off entirely transparent to the user—so that the user will not notice any change in the processing and/or display caused by the core being powered down. In order to facilitate smooth transition some link state is preserved before the core is turned off. The saved link state may include state aspects that are critical to bringing the link fully backup with core reactivation. For example, for the PCIE interface critical XP/XVE state may be retained, and for the NVLINK interface critical TL/DL state (e.g., such as equalization coefficients) may be retained. The state may be retained by clamping and latching circuitry.

Certain example embodiments may include the capability to selectively reset portions of the GPU. The intelligent circuit may provide for resetting portions of the logic without affecting the link states, in GPUs such as that shown in FIG. 3 which include multiple crossings due to core and link logic.

The link states are maintained in the link power domain because that power domain remains on. Thus, the latches are implemented in the link power domain.

The link states are maintained in an active state by a combination of clamping, latching and selective reset control.

Prior to clamping, clocks may be gated. Clocks may be gated in order to ensure that there no glitches on the asynchronous interfaces. Before clamps are enabled, embodiments may gate all the clocks going to the link states. Also, before the clamps are enabled, embodiments may put the links in L1 or L2 link power mode (e.g., PCIE in L1 and/or NVLINK in L2). After the clocks are gated, the clamping is performed.

At operation 908, the state of the cores is saved in the frame buffer. The saved state may include information associated with the currently displayed image (if any). In some embodiments, this operation may be performed earlier (e.g., even before the trigger/command for entering sleep mode is received).

At operation 910, the cores are powered off. The power may be turned off by turning off the rail to the cores (e.g., rail 332). All power domains in the GPU except for the always-on power domain, the frame buffer power domain and the high speed link power domain are powered off. In some example embodiments, one or more other power domains in the GPU may remain powered on in a manner consistent with this disclosure. In some example embodiments, the GPU may include a plurality of cores that are distributed over multiple power domains and the low power state may provide for powering off at least one of the core power domains while allowing the other core power domains to remain powered on.

In previous approaches turning off the GPU core also meant turning off the high speed IO core as well, so high speed link would be off and thus the PCIE and NVLINKs would be in an L3 link power mode. In example embodiments, the links remain powered up and isolated from the core. The PCIE link may remain in L1 and the NVLINKs may remain in L2 during the low power mode in which the core is powered off. In scenarios where the PCIE latency is not critical, but NVLINK latency must still be short, such as in long idle scenarios but without an attached NVSR panel, the PCIE link may be put in L2 while keeping the high speed link rail on to yield additional power savings.

Upon completion of operation 908, the GPU has transitioned to the desired sleep mode in which the cores are entirely powered off, and at least one of the high speed link interfaces is in a lower than fully operational power mode. In this sleep mode, the computer system including the processor that is in sleep mode, continues to operate and may continue to display an image on a display. The power savings resulting from the sleep mode of example embodiments may be less than that could result from the previously known GC6 technique, but example embodiments provide for a substantial improvement in recovery time while maintaining a majority of the power savings of GC6.

Example Process for Exiting Sleep Mode

Figure 10:
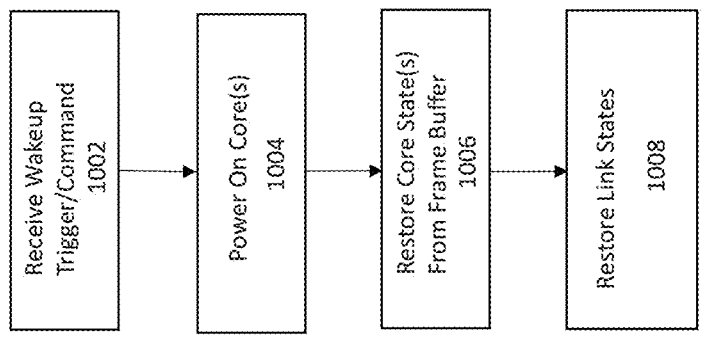
FIG. 10 illustrates a process for waking up a processor from sleep mode according to some example embodiments.

FIG. 10 illustrates a process 1000 for waking up a processor from a sleep mode according to some example embodiments. Process 1000 may be used, for example, to transition a GPU, such as GPU 106 described above from a sleep mode in which the core is powered off but high speed link interfaces remain powered on to a fully operational mode. The sleep mode may have been transitioned to using a process such as process 800 described above.

At operation 1002, the trigger and/or command to exit the low power mode is received by a sleep sequence logic in the processor that is to be transitioned to the sleep mode. In other embodiments, the logic to transition the processor may reside outside that processor. The trigger may be generated from a process such as process 800 described above.

The wake signal may be received from the GPIO interface, generated in association with another onboard device.

The wake signal may be a sideband signal from an optional embedded controller, such as controller 328 shown in FIG. 3.

In some example embodiments, exit is triggered not by sideband signaling, but via in-band traffic on the PCIE link. This allows to the present sleep mode to be in be deployed in both notebook and desktop platforms that operate over standard PCIE connectors. Previously GC6 was limited to custom notebook implementations.

At operation 1004, the cores are powered on. Wakeup control sequence circuitry in, for example, the always on island may control the sequence of waking up the processor. The cores may be powered on by, for example, supplying power on the core power rail.

At operation 1006, core states are restored to the cores by restoring from the frame buffer. This, for example, restores the core with information for display of the current image on the computer system's display.

At operation 1008, the link states are restored to the high speed links. After the core is powered on, the link states may be restored to the high speed link interfaces. In some embodiments, the restoration of the link states may be started before the core state has been completely restored from the frame buffer. The latches and clamps are released after operation 1006, once the core states are restored in order to ensure the link state is not disturbed.

In some embodiments, such as, for example, those requiring controls for DFT (Design for Test), the restoration of the link states is performed in a manner that enables accurate transfer of RAM repair information from a fuse, or other device that can keep the chip configuration programmed, through the JTAG interface to RAM. Although a JTAG interface is used in this description, the use of other types of test interface is not excluded. The RAM may be SRAMs embedded in part of the logic, and the JTAG chain connects to the SRAMs repair logic. SRAMs are usually within the control logic so that they don't directly cross voltage boundaries. Typically RAM repair information is shifted through the JTAG chain which goes through multiple power domains. To ensure RAM repair information is shifted properly (especially for the core logic which may be corrupted because core rail is powered off), a finite state machine (FSM) controls the JTAG interface (clock, reset, data) which unclamps the RAM repair JTAG interface after core power domain reset to allow this sequence go through part of restore core state. The RAM repair JTAG interface is unclamped before Fuse starts shifting out the RAM repair information. In this example embodiments, only the JTAG interface is unclamped early to shift the RAM repair information. This control logic to restore RAM repair information may be entirely hardware driven since software may not be operational at this point.

As described above, some example sleep mode may have the high speed link rail powered on, core off, PCIE interface in L1 or L2, and the NVLINK interface in L2. This results in avoiding PCIE L2/LD retraining for approximately 15 ms savings (sometimes, along with SW optimizations). This also avoids NVLINK L3 link retraining time of approximately 500 ms per link (e.g., 500 ms is a worst case retraining time).

In notebook computers and the like, by keeping the high speed PCIE links in L1 link power mode (rather than the L2/L3 mode) during the sleep mode, the time required for retraining the high speed links upon power up is reduced. In certain examples, the retraining time is reduced by 10-15 ms and thus reduces the exit latency by at least that amount. Similar exit latency savings can be obtained in server environments with high speed NVLINK buses. It should be noted that one or more of PCIE, NVLINK, USB-C, Thunderbolt and other types of high-speed serial buses can be in notebooks, servers or other types of electronic devices, and the above techniques of powering off the core while maintaining the high speed links powered on for saving exit latency are applicable to such electronic devices.

In server environments, the high speed links may include NVLINK and similar benefits may be obtained from the described sleep mode.

After completing operation 1008, the processor is in fully operational mode with the cores powered back on and the high speed link interfaces back in L0 link power mode.

A Parallel Processing Architecture

More illustrative information will now be set forth regarding various optional architectures and features with which the foregoing framework may be implemented, per the desires of the user. It should be strongly noted that the following information is set forth for illustrative purposes and should not be construed as limiting in any manner. Any of the following features may be optionally incorporated with or without the exclusion of other features described.

Figure 11:
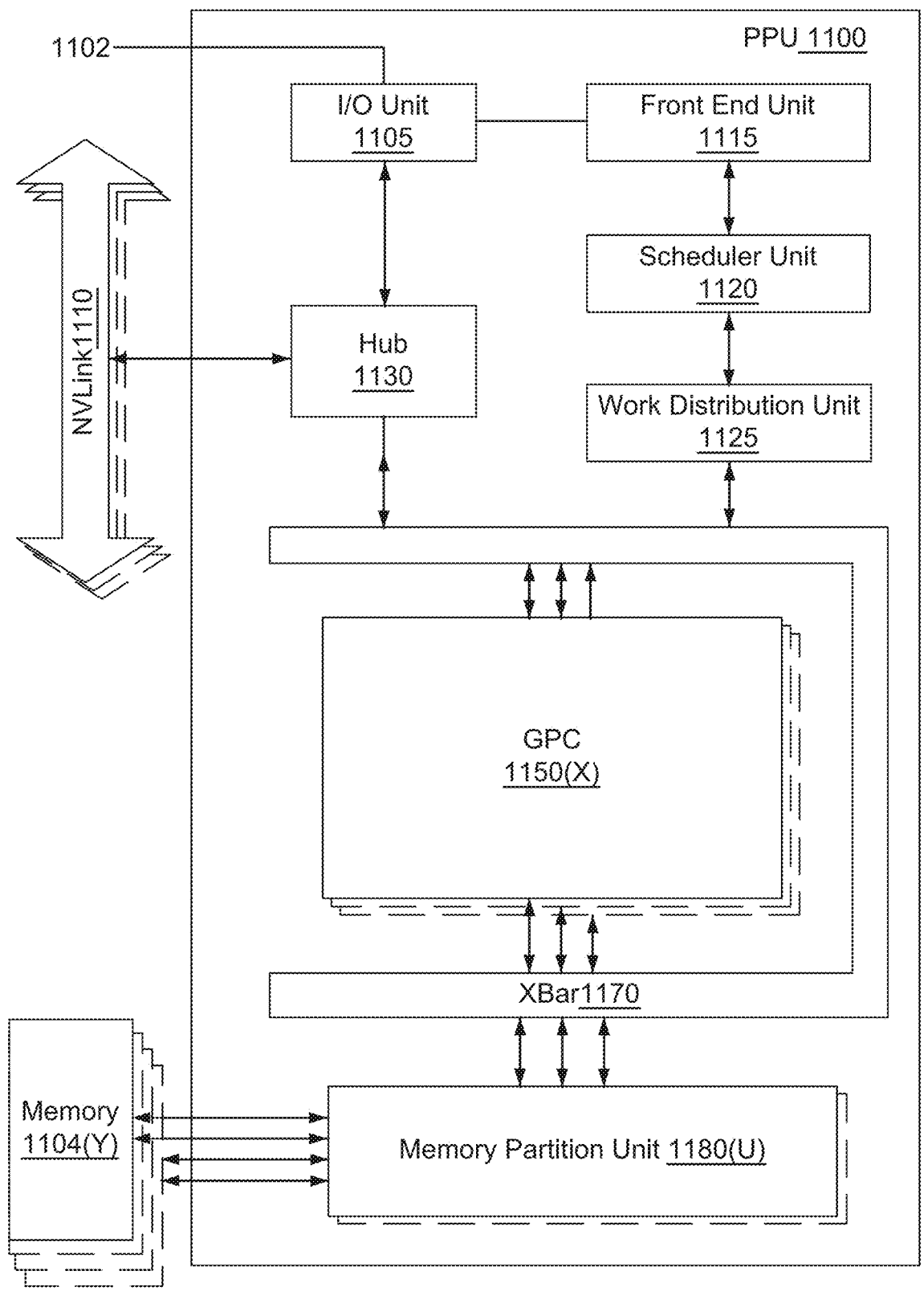
FIG. 11 illustrates a parallel processing unit, in accordance with an embodiment.

FIG. 11 illustrates a parallel processing unit (PPU) 1100, in accordance with an embodiment. In an embodiment, the PPU 1100 is a multi-threaded processor that is implemented on one or more integrated circuit devices. The PPU 1100 is a latency hiding architecture designed to process many threads in parallel. A thread (e.g., a thread of execution) is an instantiation of a set of instructions configured to be executed by the PPU 1100. In an embodiment, the PPU 1100 is a graphics processing unit (GPU) configured to implement a graphics rendering pipeline for processing three-dimensional (3D) graphics data in order to generate two-dimensional (2D) image data for display on a display device such as a liquid crystal display (LCD) device. In other embodiments, the PPU 1100 may be utilized for performing general-purpose computations. While one exemplary parallel processor is provided herein for illustrative purposes, it should be strongly noted that such processor is set forth for illustrative purposes only, and that any processor may be employed to supplement and/or substitute for the same.

One or more PPUs 1100 may be configured to accelerate thousands of High Performance Computing (HPC), data center, and machine learning applications. The PPU 1100 may be configured to accelerate numerous deep learning systems and applications including autonomous vehicle platforms, deep learning, high-accuracy speech, image, and text recognition systems, intelligent video analytics, molecular simulations, drug discovery, disease diagnosis, weather forecasting, big data analytics, astronomy, molecular dynamics simulation, financial modeling, robotics, factory automation, real-time language translation, online search optimizations, and personalized user recommendations, and the like.

As shown in FIG. 11, the PPU 1100 includes an Input/Output (I/O) unit 1105, a front end unit 1115, a scheduler unit 1120, a work distribution unit 1125, a hub 1130, a crossbar (Xbar) 1170, one or more general processing clusters (GPCs) 1150, and one or more partition units 1180. The PPU 1100 may be connected to a host processor or other PPUs 1100 via one or more high-speed NVLink 1110 interconnect. The PPU 1100 may be connected to a host processor or other peripheral devices via an interconnect 1102. The PPU 1100 may also be connected to a local memory comprising a number of memory devices 1104. In an embodiment, the local memory may comprise a number of dynamic random access memory (DRAM) devices. The DRAM devices may be configured as a high-bandwidth memory (HBM) subsystem, with multiple DRAM dies stacked within each device.

The NVLink 1110 interconnect enables systems to scale and include one or more PPUs 1100 combined with one or more CPUs, supports cache coherence between the PPUs 1100 and CPUs, and CPU mastering. Data and/or commands may be transmitted by the NVLink 1110 through the hub 1130 to/from other units of the PPU 1100 such as one or more copy engines, a video encoder, a video decoder, a power management unit, etc. (not explicitly shown). The NVLink 1110 is described in more detail in conjunction with FIG. 13B.

The I/O unit 1105 is configured to transmit and receive communications (e.g., commands, data, etc.) from a host processor (not shown) over the interconnect 1102. The I/O unit 1105 may communicate with the host processor directly via the interconnect 1102 or through one or more intermediate devices such as a memory bridge. In an embodiment, the I/O unit 1105 may communicate with one or more other processors, such as one or more of the PPUs 1100 via the interconnect 1102. In an embodiment, the I/O unit 1105 implements a Peripheral Component Interconnect Express (PCIe) interface for communications over a PCIe bus and the interconnect 1102 is a PCIe bus. In alternative embodiments, the I/O unit 1105 may implement other types of well-known interfaces for communicating with external devices.

The I/O unit 1105 decodes packets received via the interconnect 1102. In an embodiment, the packets represent commands configured to cause the PPU 1100 to perform various operations. The I/O unit 1105 transmits the decoded commands to various other units of the PPU 1100 as the commands may specify. For example, some commands may be transmitted to the front end unit 1115. Other commands may be transmitted to the hub 1130 or other units of the PPU 1100 such as one or more copy engines, a video encoder, a video decoder, a power management unit, etc. (not explicitly shown). In other words, the I/O unit 1105 is configured to route communications between and among the various logical units of the PPU 1100.

In an embodiment, a program executed by the host processor encodes a command stream in a buffer that provides workloads to the PPU 1100 for processing. A workload may comprise several instructions and data to be processed by those instructions. The buffer is a region in a memory that is accessible (e.g., read/write) by both the host processor and the PPU 1100. For example, the I/O unit 1105 may be configured to access the buffer in a system memory connected to the interconnect 1102 via memory requests transmitted over the interconnect 1102. In an embodiment, the host processor writes the command stream to the buffer and then transmits a pointer to the start of the command stream to the PPU 1100. The front end unit 1115 receives pointers to one or more command streams. The front end unit 1115 manages the one or more streams, reading commands from the streams and forwarding commands to the various units of the PPU 1100.

The front end unit 1115 is coupled to a scheduler unit 1120 that configures the various GPCs 1150 to process tasks defined by the one or more streams. The scheduler unit 1120 is configured to track state information related to the various tasks managed by the scheduler unit 1120. The state may indicate which GPC 1150 a task is assigned to, whether the task is active or inactive, a priority level associated with the task, and so forth. The scheduler unit 1120 manages the execution of a plurality of tasks on the one or more GPCs 1150.

The scheduler unit 1120 is coupled to a work distribution unit 1125 that is configured to dispatch tasks for execution on the GPCs 1150. The work distribution unit 1125 may track a number of scheduled tasks received from the scheduler unit 1120. In an embodiment, the work distribution unit 1125 manages a pending task pool and an active task pool for each of the GPCs 1150. The pending task pool may comprise a number of slots (e.g., 32 slots) that contain tasks assigned to be processed by a particular GPC 1150. The active task pool may comprise a number of slots (e.g., 4 slots) for tasks that are actively being processed by the GPCs 1150. As a GPC 1150 finishes the execution of a task, that task is evicted from the active task pool for the GPC 1150 and one of the other tasks from the pending task pool is selected and scheduled for execution on the GPC 1150. If an active task has been idle on the GPC 1150, such as while waiting for a data dependency to be resolved, then the active task may be evicted from the GPC 1150 and returned to the pending task pool while another task in the pending task pool is selected and scheduled for execution on the GPC 1150.

The work distribution unit 1125 communicates with the one or more GPCs 1150 via XBar 1170. The XBar 1170 is an interconnect network that couples many of the units of the PPU 1100 to other units of the PPU 1100. For example, the XBar 1170 may be configured to couple the work distribution unit 1125 to a particular GPC 1150. Although not shown explicitly, one or more other units of the PPU 1100 may also be connected to the XBar 1170 via the hub 1130.

The tasks are managed by the scheduler unit 1120 and dispatched to a GPC 1150 by the work distribution unit 1125. The GPC 1150 is configured to process the task and generate results. The results may be consumed by other tasks within the GPC 1150, routed to a different GPC 1150 via the XBar 1170, or stored in the memory 1104. The results can be written to the memory 1104 via the partition units 1180, which implement a memory interface for reading and writing data to/from the memory 1104. The results can be transmitted to another PPU 1104 or CPU via the NVLink 1110. In an embodiment, the PPU 1100 includes a number U of partition units 1180 that is equal to the number of separate and distinct memory devices 1104 coupled to the PPU 1100. A partition unit 1180 will be described in more detail below in conjunction with FIG. 12B.

In an embodiment, a host processor executes a driver kernel that implements an application programming interface (API) that enables one or more applications executing on the host processor to schedule operations for execution on the PPU 1100. In an embodiment, multiple compute applications are simultaneously executed by the PPU 1100 and the PPU 1100 provides isolation, quality of service (QoS), and independent address spaces for the multiple compute applications. An application may generate instructions (e.g., API calls) that cause the driver kernel to generate one or more tasks for execution by the PPU 1100. The driver kernel outputs tasks to one or more streams being processed by the PPU 1100. Each task may comprise one or more groups of related threads, referred to herein as a warp. In an embodiment, a warp comprises 32 related threads that may be executed in parallel. Cooperating threads may refer to a plurality of threads including instructions to perform the task and that may exchange data through shared memory. Threads and cooperating threads are described in more detail in conjunction with FIG. 13A.

Figure 12A:
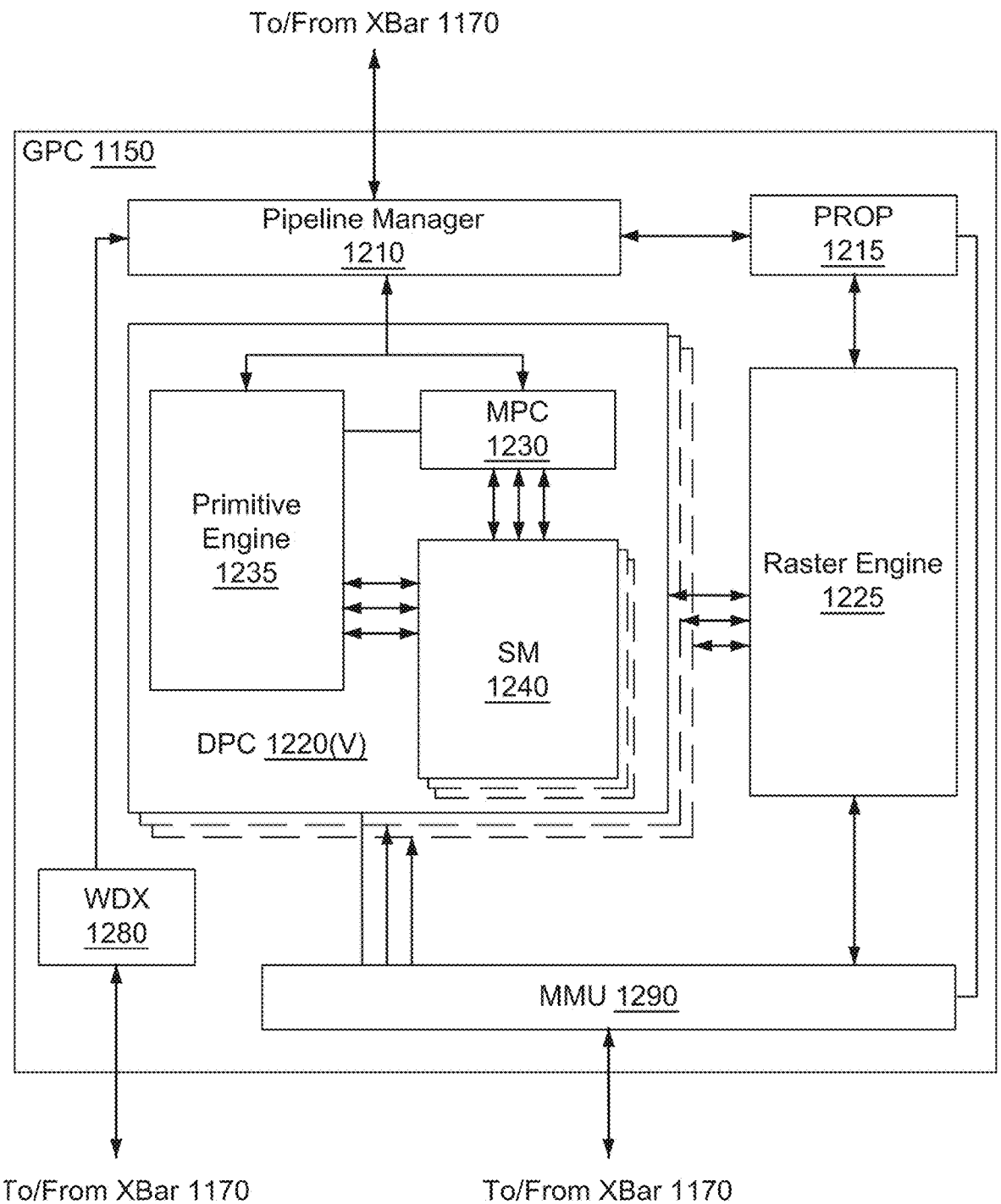
FIG. 12A illustrates a general processing cluster within the parallel processing unit of FIG. 11, in accordance with an embodiment.

FIG. 12A illustrates a GPC 1150 of the PPU 1100 of FIG. 11, in accordance with an embodiment. As shown in FIG. 12A, each GPC 1150 includes a number of hardware units for processing tasks. In an embodiment, each GPC 1150 includes a pipeline manager 1210, a pre-raster operations unit (PROP) 1215, a raster engine 1225, a work distribution crossbar (WDX) 1280, a memory management unit (MMU) 1290, and one or more Data Processing Clusters (DPCs) 1220. It will be appreciated that the GPC 1150 of FIG. 12A may include other hardware units in lieu of or in addition to the units shown in FIG. 12A.

In an embodiment, the operation of the GPC 1150 is controlled by the pipeline manager 1210. The pipeline manager 1210 manages the configuration of the one or more DPCs 1220 for processing tasks allocated to the GPC 1150. In an embodiment, the pipeline manager 1210 may configure at least one of the one or more DPCs 1220 to implement at least a portion of a graphics rendering pipeline. For example, a DPC 1220 may be configured to execute a vertex shader program on the programmable streaming multiprocessor (SM) 1240. The pipeline manager 1210 may also be configured to route packets received from the work distribution unit 1125 to the appropriate logical units within the GPC 1150. For example, some packets may be routed to fixed function hardware units in the PROP 1215 and/or raster engine 1225 while other packets may be routed to the DPCs 1220 for processing by the primitive engine 1235 or the SM 1240. In an embodiment, the pipeline manager 1210 may configure at least one of the one or more DPCs 1220 to implement a neural network model and/or a computing pipeline.

Figure 12B:
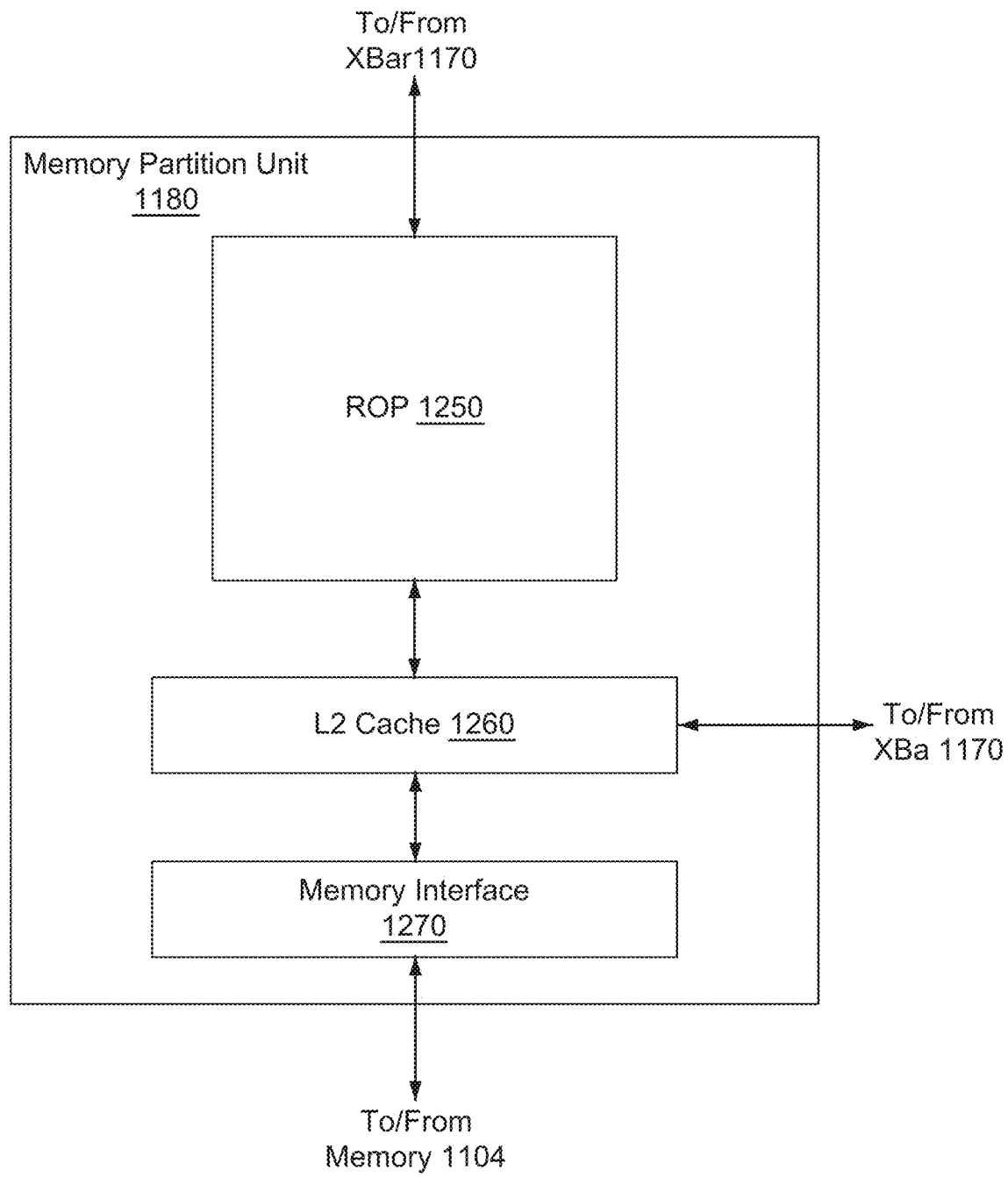
FIG. 12B illustrates a memory partition unit of the parallel processing unit of FIG. 11, in accordance with an embodiment.

The PROP unit 1215 is configured to route data generated by the raster engine 1225 and the DPCs 1220 to a Raster Operations (ROP) unit, described in more detail in conjunction with FIG. 12B. The PROP unit 1215 may also be configured to perform optimizations for color blending, organize pixel data, perform address translations, and the like.

The raster engine 1225 includes a number of fixed function hardware units configured to perform various raster operations. In an embodiment, the raster engine 1225 includes a setup engine, a coarse raster engine, a culling engine, a clipping engine, a fine raster engine, and a tile coalescing engine. The setup engine receives transformed vertices and generates plane equations associated with the geometric primitive defined by the vertices. The plane equations are transmitted to the coarse raster engine to generate coverage information (e.g., an x,y coverage mask for a tile) for the primitive. The output of the coarse raster engine is transmitted to the culling engine where fragments associated with the primitive that fail a z-test are culled, and non-culled fragments are transmitted to a clipping engine where fragments lying outside a viewing frustum are clipped. Those fragments that survive clipping and culling may be passed to the fine raster engine to generate attributes for the pixel fragments based on the plane equations generated by the setup engine. The output of the raster engine 1225 comprises fragments to be processed, for example, by a fragment shader implemented within a DPC 1220.

Each DPC 1220 included in the GPC 1150 includes an M-Pipe Controller (MPC) 1230, a primitive engine 1235, and one or more SMs 1240. The MPC 1230 controls the operation of the DPC 1220, routing packets received from the pipeline manager 1210 to the appropriate units in the DPC 1220. For example, packets associated with a vertex may be routed to the primitive engine 1235, which is configured to fetch vertex attributes associated with the vertex from the memory 1104. In contrast, packets associated with a shader program may be transmitted to the SM 1240.

The SM 1240 comprises a programmable streaming processor that is configured to process tasks represented by a number of threads. Each SM 1240 is multi-threaded and configured to execute a plurality of threads (e.g., 32 threads) from a particular group of threads concurrently. In an embodiment, the SM 1240 implements a SIMD (Single-Instruction, Multiple-Data) architecture where each thread in a group of threads (e.g., a warp) is configured to process a different set of data based on the same set of instructions. All threads in the group of threads execute the same instructions. In another embodiment, the SM 1240 implements a SIMT (Single-Instruction, Multiple Thread) architecture where each thread in a group of threads is configured to process a different set of data based on the same set of instructions, but where individual threads in the group of threads are allowed to diverge during execution. In an embodiment, a program counter, call stack, and execution state is maintained for each warp, enabling concurrency between warps and serial execution within warps when threads within the warp diverge. In another embodiment, a program counter, call stack, and execution state is maintained for each individual thread, enabling equal concurrency between all threads, within and between warps. When execution state is maintained for each individual thread, threads executing the same instructions may be converged and executed in parallel for maximum efficiency. The SM 1240 will be described in more detail below in conjunction with FIG. 13A.

The MMU 1290 provides an interface between the GPC 1150 and the partition unit 1180. The MMU 1290 may provide translation of virtual addresses into physical addresses, memory protection, and arbitration of memory requests. In an embodiment, the MMU 1290 provides one or more translation lookaside buffers (TLBs) for performing translation of virtual addresses into physical addresses in the memory 1104.

FIG. 12B illustrates a memory partition unit 1180 of the PPU 1100 of FIG. 11, in accordance with an embodiment. As shown in FIG. 12B, the memory partition unit 1180 includes a Raster Operations (ROP) unit 1250, a level two (L2) cache 1260, and a memory interface 1270. The memory interface 1270 is coupled to the memory 1104. Memory interface 1270 may implement 32, 64, 128, 1024-bit data buses, or the like, for high-speed data transfer. In an embodiment, the PPU 1100 incorporates U memory interfaces 1270, one memory interface 1270 per pair of partition units 1180, where each pair of partition units 1180 is connected to a corresponding memory device 1104. For example, PPU 1100 may be connected to up to Y memory devices 1104, such as high bandwidth memory stacks or graphics double-data-rate, version 5, synchronous dynamic random access memory, or other types of persistent storage.

In an embodiment, the memory interface 1270 implements an HBM2 memory interface and Y equals half U. In an embodiment, the HBM2 memory stacks are located on the same physical package as the PPU 1100, providing substantial power and area savings compared with conventional GDDR5 SDRAM systems. In an embodiment, each HBM2 stack includes four memory dies and Y equals 4, with HBM2 stack including two 128-bit channels per die for a total of 8 channels and a data bus width of 1024 bits.

In an embodiment, the memory 1104 supports Single-Error Correcting Double-Error Detecting (SECDED) Error Correction Code (ECC) to protect data. ECC provides higher reliability for compute applications that are sensitive to data corruption. Reliability is especially important in large-scale cluster computing environments where PPUs 1100 process very large datasets and/or run applications for extended periods.

In an embodiment, the PPU 1100 implements a multi-level memory hierarchy. In an embodiment, the memory partition unit 1180 supports a unified memory to provide a single unified virtual address space for CPU and PPU 1100 memory, enabling data sharing between virtual memory systems. In an embodiment the frequency of accesses by a PPU 1100 to memory located on other processors is traced to ensure that memory pages are moved to the physical memory of the PPU 1100 that is accessing the pages more frequently. In an embodiment, the NVLink 1110 supports address translation services allowing the PPU 1100 to directly access a CPU's page tables and providing full access to CPU memory by the PPU 1100.

In an embodiment, copy engines transfer data between multiple PPUs 1100 or between PPUs 1100 and CPUs. The copy engines can generate page faults for addresses that are not mapped into the page tables. The memory partition unit 1180 can then service the page faults, mapping the addresses into the page table, after which the copy engine can perform the transfer. In a conventional system, memory is pinned (e.g., non-pageable) for multiple copy engine operations between multiple processors, substantially reducing the available memory. With hardware page faulting, addresses can be passed to the copy engines without worrying if the memory pages are resident, and the copy process is transparent.

Data from the memory 1104 or other system memory may be fetched by the memory partition unit 1180 and stored in the L2 cache 1260, which is located on-chip and is shared between the various GPCs 1150. As shown, each memory partition unit 1180 includes a portion of the L2 cache 1260 associated with a corresponding memory device 1104. Lower level caches may then be implemented in various units within the GPCs 1150. For example, each of the SMs 1240 may implement a level one (L1) cache. The L1 cache is private memory that is dedicated to a particular SM 1240. Data from the L2 cache 1260 may be fetched and stored in each of the L1 caches for processing in the functional units of the SMs 1240. The L2 cache 1260 is coupled to the memory interface 1270 and the XBar 1170.

The ROP unit 1250 performs graphics raster operations related to pixel color, such as color compression, pixel blending, and the like. The ROP unit 1250 also implements depth testing in conjunction with the raster engine 1225, receiving a depth for a sample location associated with a pixel fragment from the culling engine of the raster engine 1225. The depth is tested against a corresponding depth in a depth buffer for a sample location associated with the fragment. If the fragment passes the depth test for the sample location, then the ROP unit 1250 updates the depth buffer and transmits a result of the depth test to the raster engine 1225. It will be appreciated that the number of partition units 1180 may be different than the number of GPCs 1150 and, therefore, each ROP unit 1250 may be coupled to each of the GPCs 1150. The ROP unit 1250 tracks packets received from the different GPCs 1150 and determines which GPC 1150 that a result generated by the ROP unit 1250 is routed to through the Xbar 1170. Although the ROP unit 1250 is included within the memory partition unit 1180 in FIG. 12B, in other embodiment, the ROP unit 1250 may be outside of the memory partition unit 1180. For example, the ROP unit 1250 may reside in the GPC 1150 or another unit.

Figure 13A:
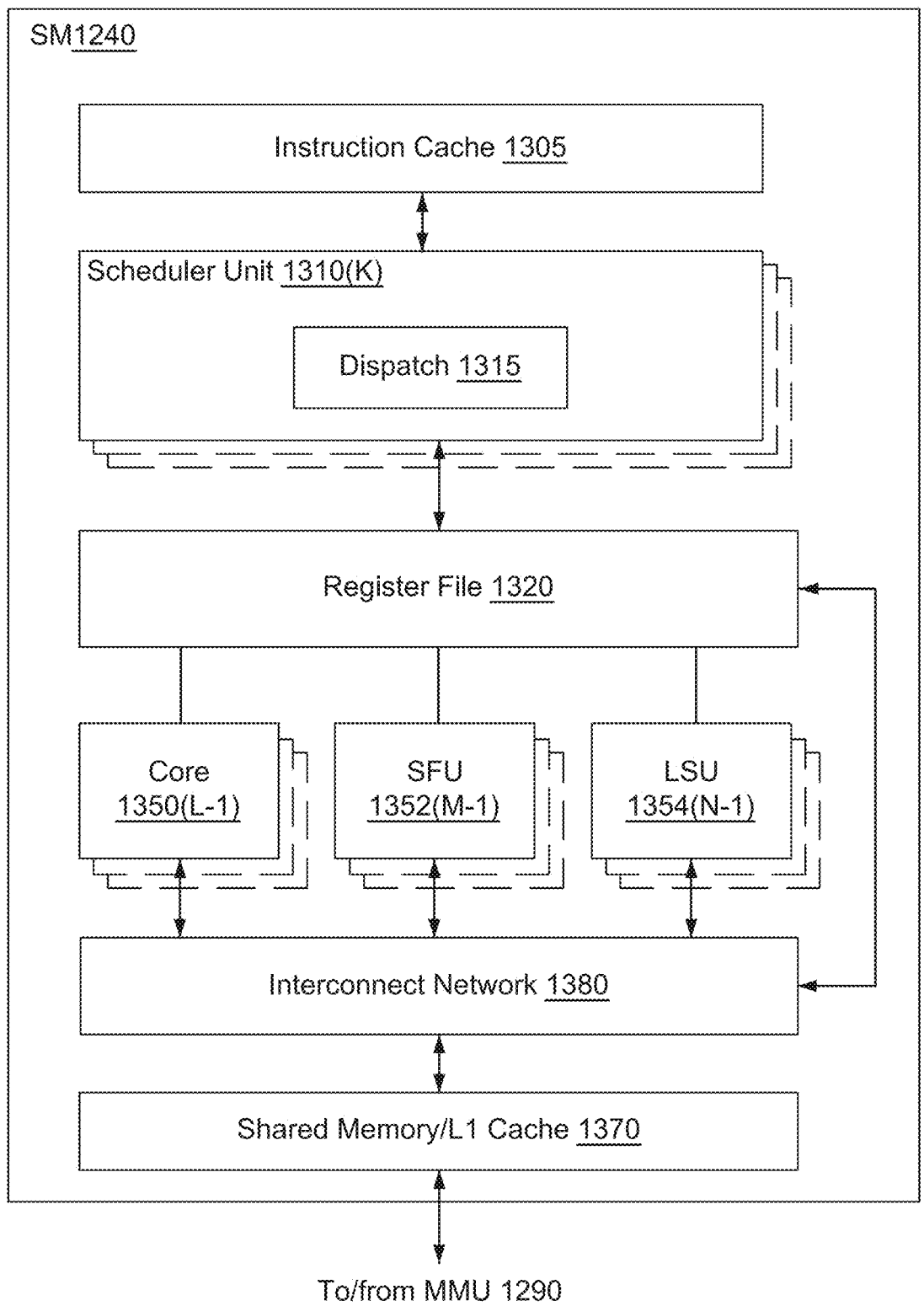
FIG. 13A illustrates the streaming multiprocessor of FIG. 12A, in accordance with an embodiment.

FIG. 13A illustrates the streaming multiprocessor 1240 of FIG. 12A, in accordance with an embodiment. As shown in FIG. 13A, the SM 1240 includes an instruction cache 1305, one or more scheduler units 1310, a register file 1320, one or more processing cores 1350, one or more special function units (SFUs) 1352, one or more load/store units (LSUs) 1354, an interconnect network 1380, a shared memory/L1 cache 1370.

As described above, the work distribution unit 1125 dispatches tasks for execution on the GPCs 1150 of the PPU 1100. The tasks are allocated to a particular DPC 1220 within a GPC 1150 and, if the task is associated with a shader program, the task may be allocated to an SM 1240. The scheduler unit 1310 receives the tasks from the work distribution unit 1125 and manages instruction scheduling for one or more thread blocks assigned to the SM 1240. The scheduler unit 1310 schedules thread blocks for execution as warps of parallel threads, where each thread block is allocated at least one warp. In an embodiment, each warp executes 32 threads. The scheduler unit 1310 may manage a plurality of different thread blocks, allocating the warps to the different thread blocks and then dispatching instructions from the plurality of different cooperative groups to the various functional units (e.g., cores 1350, SFUs 1352, and LSUs 1354) during each clock cycle.

Cooperative Groups is a programming model for organizing groups of communicating threads that allows developers to express the granularity at which threads are communicating, enabling the expression of richer, more efficient parallel decompositions. Cooperative launch APIs support synchronization amongst thread blocks for the execution of parallel algorithms. Conventional programming models provide a single, simple construct for synchronizing cooperating threads: a barrier across all threads of a thread block (e.g., the syncthreads( ) function). However, programmers would often like to define groups of threads at smaller than thread block granularities and synchronize within the defined groups to enable greater performance, design flexibility, and software reuse in the form of collective group-wide function interfaces.

Cooperative Groups enables programmers to define groups of threads explicitly at sub-block (e.g., as small as a single thread) and multi-block granularities, and to perform collective operations such as synchronization on the threads in a cooperative group. The programming model supports clean composition across software boundaries, so that libraries and utility functions can synchronize safely within their local context without having to make assumptions about convergence. Cooperative Groups primitives enable new patterns of cooperative parallelism, including producer-consumer parallelism, opportunistic parallelism, and global synchronization across an entire grid of thread blocks.

A dispatch unit 1315 is configured to transmit instructions to one or more of the functional units. In the embodiment, the scheduler unit 1310 includes two dispatch units 1315 that enable two different instructions from the same warp to be dispatched during each clock cycle. In alternative embodiments, each scheduler unit 1310 may include a single dispatch unit 1315 or additional dispatch units 1315.

Each SM 1240 includes a register file 1320 that provides a set of registers for the functional units of the SM 1240. In an embodiment, the register file 1320 is divided between each of the functional units such that each functional unit is allocated a dedicated portion of the register file 1320. In another embodiment, the register file 1320 is divided between the different warps being executed by the SM 1240. The register file 1320 provides temporary storage for operands connected to the data paths of the functional units.

Each SM 1240 comprises L processing cores 1350. In an embodiment, the SM 1240 includes a large number (e.g., 128, etc.) of distinct processing cores 1350. Each core 1350 may include a fully-pipelined, single-precision, double-precision, and/or mixed precision processing unit that includes a floating point arithmetic logic unit and an integer arithmetic logic unit. In an embodiment, the floating point arithmetic logic units implement the IEEE 754-2008 standard for floating point arithmetic. In an embodiment, the cores 1350 include 64 single-precision (32-bit) floating point cores, 64 integer cores, 32 double-precision (64-bit) floating point cores, and 8 tensor cores.

Tensor cores are configured to perform matrix operations, and, in an embodiment, one or more tensor cores are included in the cores 1350. In particular, the tensor cores are configured to perform deep learning matrix arithmetic, such as convolution operations for neural network training and inferencing. In an embodiment, each tensor core operates on a 4×4 matrix and performs a matrix multiply and accumulate operation D=A☐B+C, where A, B, C, and D are 4×4 matrices.

In an embodiment, the matrix multiply inputs A and B are 16-bit floating point matrices, while the accumulation matrices C and D may be 16-bit floating point or 32-bit floating point matrices. Tensor Cores operate on 16-bit floating point input data with 32-bit floating point accumulation. The 16-bit floating point multiply requires 64 operations and results in a full precision product that is then accumulated using 32-bit floating point addition with the other intermediate products for a 4×4×4 matrix multiply. In practice, Tensor Cores are used to perform much larger two-dimensional or higher dimensional matrix operations, built up from these smaller elements. An API, such as CUDA 9 C++ API, exposes specialized matrix load, matrix multiply and accumulate, and matrix store operations to efficiently use Tensor Cores from a CUDA-C++ program. At the CUDA level, the warp-level interface assumes 16×16 size matrices spanning all 32 threads of the warp.

Each SM 1240 also comprises M SFUs 1352 that perform special functions (e.g., attribute evaluation, reciprocal square root, and the like). In an embodiment, the SFUs 1352 may include a tree traversal unit configured to traverse a hierarchical tree data structure. In an embodiment, the SFUs 1352 may include texture unit configured to perform texture map filtering operations. In an embodiment, the texture units are configured to load texture maps (e.g., a 2D array of texels) from the memory 1104 and sample the texture maps to produce sampled texture values for use in shader programs executed by the SM 1240. In an embodiment, the texture maps are stored in the shared memory/L1 cache 1270. The texture units implement texture operations such as filtering operations using mip-maps (e.g., texture maps of varying levels of detail). In an embodiment, each SM 1140 includes two texture units.

Each SM 1240 also comprises N LSUs 1354 that implement load and store operations between the shared memory/L1 cache 1370 and the register file 1320. Each SM 1240 includes an interconnect network 1380 that connects each of the functional units to the register file 1320 and the LSU 1354 to the register file 1320, shared memory/L1 cache 1370. In an embodiment, the interconnect network 1380 is a crossbar that can be configured to connect any of the functional units to any of the registers in the register file 1320 and connect the LSUs 1354 to the register file and memory locations in shared memory/L1 cache 1370.

The shared memory/L1 cache 1370 is an array of on-chip memory that allows for data storage and communication between the SM 1240 and the primitive engine 1235 and between threads in the SM 1240. In an embodiment, the shared memory/L1 cache 1370 comprises 128 KB of storage capacity and is in the path from the SM 1240 to the partition unit 1180. The shared memory/L1 cache 1370 can be used to cache reads and writes. One or more of the shared memory/L1 cache 1370, L2 cache 1260, and memory 1104 are backing stores.

Combining data cache and shared memory functionality into a single memory block provides the best overall performance for both types of memory accesses. The capacity is usable as a cache by programs that do not use shared memory. For example, if shared memory is configured to use half of the capacity, texture and load/store operations can use the remaining capacity. Integration within the shared memory/L1 cache 1370 enables the shared memory/L1 cache 1370 to function as a high-throughput conduit for streaming data while simultaneously providing high-bandwidth and low-latency access to frequently reused data.

When configured for general purpose parallel computation, a simpler configuration can be used compared with graphics processing. Specifically, the fixed function graphics processing units shown in FIG. 11, are bypassed, creating a much simpler programming model. In the general purpose parallel computation configuration, the work distribution unit 1125 assigns and distributes blocks of threads directly to the DPCs 1220. The threads in a block execute the same program, using a unique thread ID in the calculation to ensure each thread generates unique results, using the SM 1240 to execute the program and perform calculations, shared memory/L1 cache 1370 to communicate between threads, and the LSU 1354 to read and write global memory through the shared memory/L1 cache 1370 and the memory partition unit 1180. When configured for general purpose parallel computation, the SM 1240 can also write commands that the scheduler unit 1120 can use to launch new work on the DPCs 1220.

The PPU 1100 may be included in a desktop computer, a laptop computer, a tablet computer, servers, supercomputers, a smart-phone (e.g., a wireless, hand-held device), personal digital assistant (PDA), a digital camera, a vehicle, a head mounted display, a hand-held electronic device, and the like. In an embodiment, the PPU 1100 is embodied on a single semiconductor substrate. In another embodiment, the PPU 1100 is included in a system-on-a-chip (SoC) along with one or more other devices such as additional PPUs 1100, the memory 1104, a reduced instruction set computer (RISC) CPU, a memory management unit (MMU), a digital-to-analog converter (DAC), and the like.

In an embodiment, the PPU 1100 may be included on a graphics card that includes one or more memory devices 1104. The graphics card may be configured to interface with a PCIe slot on a motherboard of a desktop computer. In yet another embodiment, the PPU 1100 may be an integrated graphics processing unit (iGPU) or parallel processor included in the chipset of the motherboard.

Exemplary Computing System

Systems with multiple GPUs and CPUs are used in a variety of industries as developers expose and leverage more parallelism in applications such as artificial intelligence computing. High-performance GPU-accelerated systems with tens to many thousands of compute nodes are deployed in data centers, research facilities, and supercomputers to solve ever larger problems. As the number of processing devices within the high-performance systems increases, the communication and data transfer mechanisms need to scale to support the increased bandwidth.

Figure 13B:
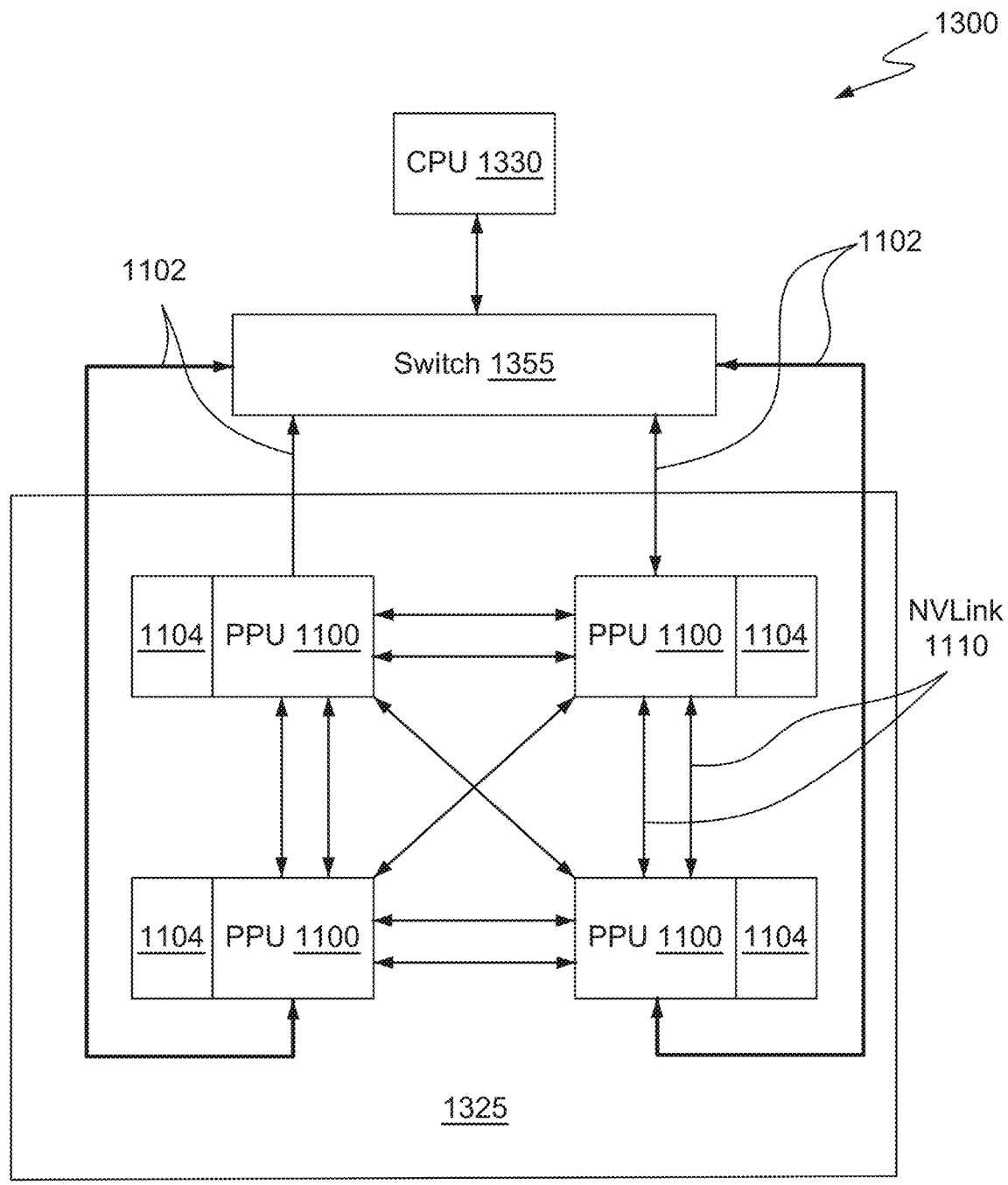
FIG. 13B is a conceptual diagram of a processing system implemented using the parallel processing unit (PPU) of FIG. 11, in accordance with an embodiment.

FIG. 13B is a conceptual diagram of a processing system 1300 implemented using the PPU 1100 of FIG. 11, in accordance with an embodiment. The exemplary system 1300 may be configured to implement the methods 210, 220, 230 and 240 shown in FIGS. 2A-2E. The processing system 1300 includes a CPU 1330, switch 1355, and multiple PPUs 1100 each and respective memories 1104. The NVLink 1110 provides high-speed communication links between each of the PPUs 1100. Although a particular number of NVLink 1110 and interconnect 1102 connections are illustrated in FIG. 13B, the number of connections to each PPU 1100 and the CPU 1330 may vary. The switch 1355 interfaces between the interconnect 1102 and the CPU 1330. The PPUs 1100, memories 1104, and NVLinks 1110 may be situated on a single semiconductor platform to form a parallel processing module 1325. In an embodiment, the switch 1355 supports two or more protocols to interface between various different connections and/or links.

In another embodiment (not shown), the NVLink 1110 provides one or more high-speed communication links between each of the PPUs 1100 and the CPU 1330 and the switch 1355 interfaces between the interconnect 1102 and each of the PPUs 1100. The PPUs 1100, memories 1104, and interconnect 1102 may be situated on a single semiconductor platform to form a parallel processing module 1325. In yet another embodiment (not shown), the interconnect 1102 provides one or more communication links between each of the PPUs 1100 and the CPU 1330 and the switch 1355 interfaces between each of the PPUs 1100 using the NVLink 1110 to provide one or more high-speed communication links between the PPUs 1100. In another embodiment (not shown), the NVLink 1110 provides one or more high-speed communication links between the PPUs 1100 and the CPU 1330 through the switch 1355. In yet another embodiment (not shown), the interconnect 1102 provides one or more communication links between each of the PPUs 1100 directly. One or more of the NVLink 1110 high-speed communication links may be implemented as a physical NVLink interconnect or either an on-chip or on-die interconnect using the same protocol as the NVLink 1110.

In the context of the present description, a single semiconductor platform may refer to a sole unitary semiconductor-based integrated circuit fabricated on a die or chip. It should be noted that the term single semiconductor platform may also refer to multi-chip modules with increased connectivity which simulate on-chip operation and make substantial improvements over utilizing a conventional bus implementation. Of course, the various circuits or devices may also be situated separately or in various combinations of semiconductor platforms per the desires of the user. Alternately, the parallel processing module 1325 may be implemented as a circuit board substrate and each of the PPUs 1100 and/or memories 1104 may be packaged devices.

In an embodiment, the CPU 1330, switch 1355, and the parallel processing module 1325 are situated on a single semiconductor platform.

In an embodiment, the signaling rate of each NVLink 1110 is 20 to 25 Gigabits/second and each PPU 1100 includes six NVLink 1110 interfaces (as shown in FIG. 13B, five NVLink 1110 interfaces are included for each PPU 1100). Each NVLink 1110 provides a data transfer rate of 25 Gigabytes/second in each direction, with six links providing 1100 Gigabytes/second. The NVLinks 1110 can be used exclusively for PPU-to-PPU communication as shown in FIG. 13B, or some combination of PPU-to-PPU and PPU-to-CPU, when the CPU 1330 also includes one or more NVLink 1110 interfaces.

In an embodiment, the NVLink 1110 allows direct load/store/atomic access from the CPU 1330 to each PPU's 1100 memory 1104. In an embodiment, the NVLink 1110 supports coherency operations, allowing data read from the memories 1104 to be stored in the cache hierarchy of the CPU 1330, reducing cache access latency for the CPU 1330. In an embodiment, the NVLink 1110 includes support for Address Translation Services (ATS), allowing the PPU 1100 to directly access page tables within the CPU 1330. One or more of the NVLinks 1110 may also be configured to operate in a low-power mode.

Figure 13C:
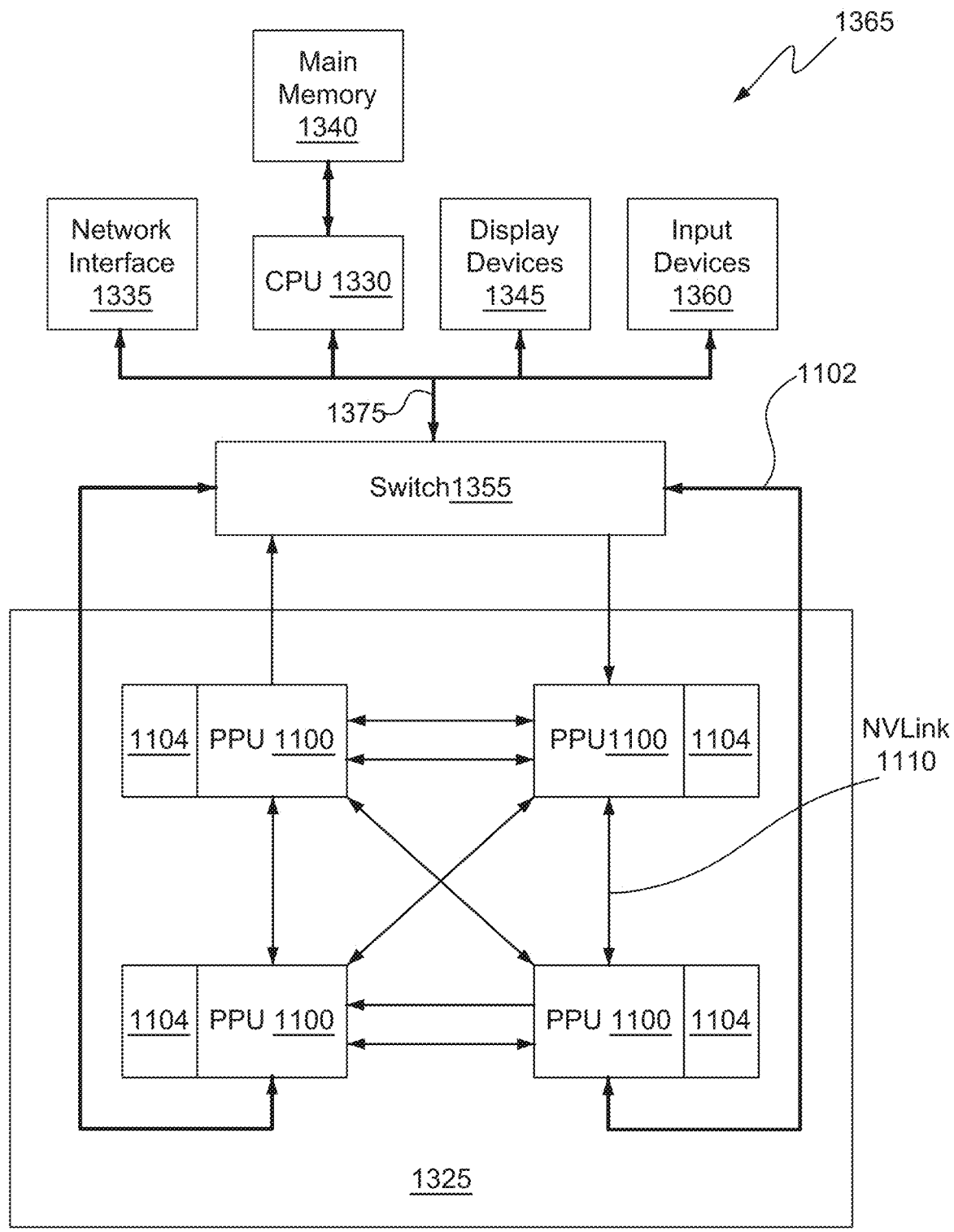
FIG. 13C illustrates an exemplary system in which the various architecture and/or functionality of the various previous embodiments may be implemented.

FIG. 13C illustrates an exemplary system 1365 in which the various architecture and/or functionality of the various previous embodiments may be implemented. The exemplary system 1365 may be configured to implement the methods 210, 220, 230 and 240 shown in FIGS. 2A-2E.

As shown, a system 1365 is provided including at least one central processing unit 1330 that is connected to a communication bus 1375. The communication bus 1375 may be implemented using any suitable protocol, such as PCI (Peripheral Component Interconnect), PCI-Express, AGP (Accelerated Graphics Port), HyperTransport, or any other bus or point-to-point communication protocol(s). The system 1365 also includes a main memory 1340. Control logic (software) and data are stored in the main memory 1340 which may take the form of random access memory (RAM).

The system 1365 also includes input devices 1360, the parallel processing system 1325, and display devices 1345, e.g. a conventional CRT (cathode ray tube), LCD (liquid crystal display), LED (light emitting diode), plasma display or the like. User input may be received from the input devices 1360, e.g., keyboard, mouse, touchpad, microphone, and the like. Each of the foregoing modules and/or devices may even be situated on a single semiconductor platform to form the system 1365. Alternately, the various modules may also be situated separately or in various combinations of semiconductor platforms per the desires of the user.

Further, the system 1365 may be coupled to a network (e.g., a telecommunications network, local area network (LAN), wireless network, wide area network (WAN) such as the Internet, peer-to-peer network, cable network, or the like) through a network interface 1335 for communication purposes.

The system 1365 may also include a secondary storage (not shown). The secondary storage includes, for example, a hard disk drive and/or a removable storage drive, representing a floppy disk drive, a magnetic tape drive, a compact disk drive, digital versatile disk (DVD) drive, recording device, universal serial bus (USB) flash memory. The removable storage drive reads from and/or writes to a removable storage unit in a well-known manner.

Computer programs, or computer control logic algorithms, may be stored in the main memory 1340 and/or the secondary storage. Such computer programs, when executed, enable the system 1365 to perform various functions. The memory 1340, the storage, and/or any other storage are possible examples of computer-readable media.

The architecture and/or functionality of the various previous figures may be implemented in the context of a general computer system, a circuit board system, a game console system dedicated for entertainment purposes, an application-specific system, and/or any other desired system. For example, the system 1365 may take the form of a desktop computer, a laptop computer, a tablet computer, servers, supercomputers, a smart-phone (e.g., a wireless, hand-held device), personal digital assistant (PDA), a digital camera, a vehicle, a head mounted display, a hand-held electronic device, a mobile phone device, a television, workstation, game consoles, embedded system, and/or any other type of logic.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

Graphics Processing Pipeline

In an embodiment, the PPU 1100 comprises a graphics processing unit (GPU). The PPU 1100 is configured to receive commands that specify shader programs for processing graphics data. Graphics data may be defined as a set of primitives such as points, lines, triangles, quads, triangle strips, and the like. Typically, a primitive includes data that specifies a number of vertices for the primitive (e.g., in a model-space coordinate system) as well as attributes associated with each vertex of the primitive. The PPU 1100 can be configured to process the graphics primitives to generate a frame buffer (e.g., pixel data for each of the pixels of the display).

An application writes model data for a scene (e.g., a collection of vertices and attributes) to a memory such as a system memory or memory 1104. The model data defines each of the objects that may be visible on a display. The application then makes an API call to the driver kernel that requests the model data to be rendered and displayed. The driver kernel reads the model data and writes commands to the one or more streams to perform operations to process the model data. The commands may reference different shader programs to be implemented on the SMs 1240 of the PPU 1100 including one or more of a vertex shader, hull shader, domain shader, geometry shader, and a pixel shader. For example, one or more of the SMs 1240 may be configured to execute a vertex shader program that processes a number of vertices defined by the model data. In an embodiment, the different SMs 1240 may be configured to execute different shader programs concurrently. For example, a first subset of SMs 1240 may be configured to execute a vertex shader program while a second subset of SMs 1240 may be configured to execute a pixel shader program. The first subset of SMs 1240 processes vertex data to produce processed vertex data and writes the processed vertex data to the L2 cache 1260 and/or the memory 1104. After the processed vertex data is rasterized (e.g., transformed from three-dimensional data into two-dimensional data in screen space) to produce fragment data, the second subset of SMs 1240 executes a pixel shader to produce processed fragment data, which is then blended with other processed fragment data and written to the frame buffer in memory 1104. The vertex shader program and pixel shader program may execute concurrently, processing different data from the same scene in a pipelined fashion until all of the model data for the scene has been rendered to the frame buffer. Then, the contents of the frame buffer are transmitted to a display controller for display on a display device.

Figure 14:
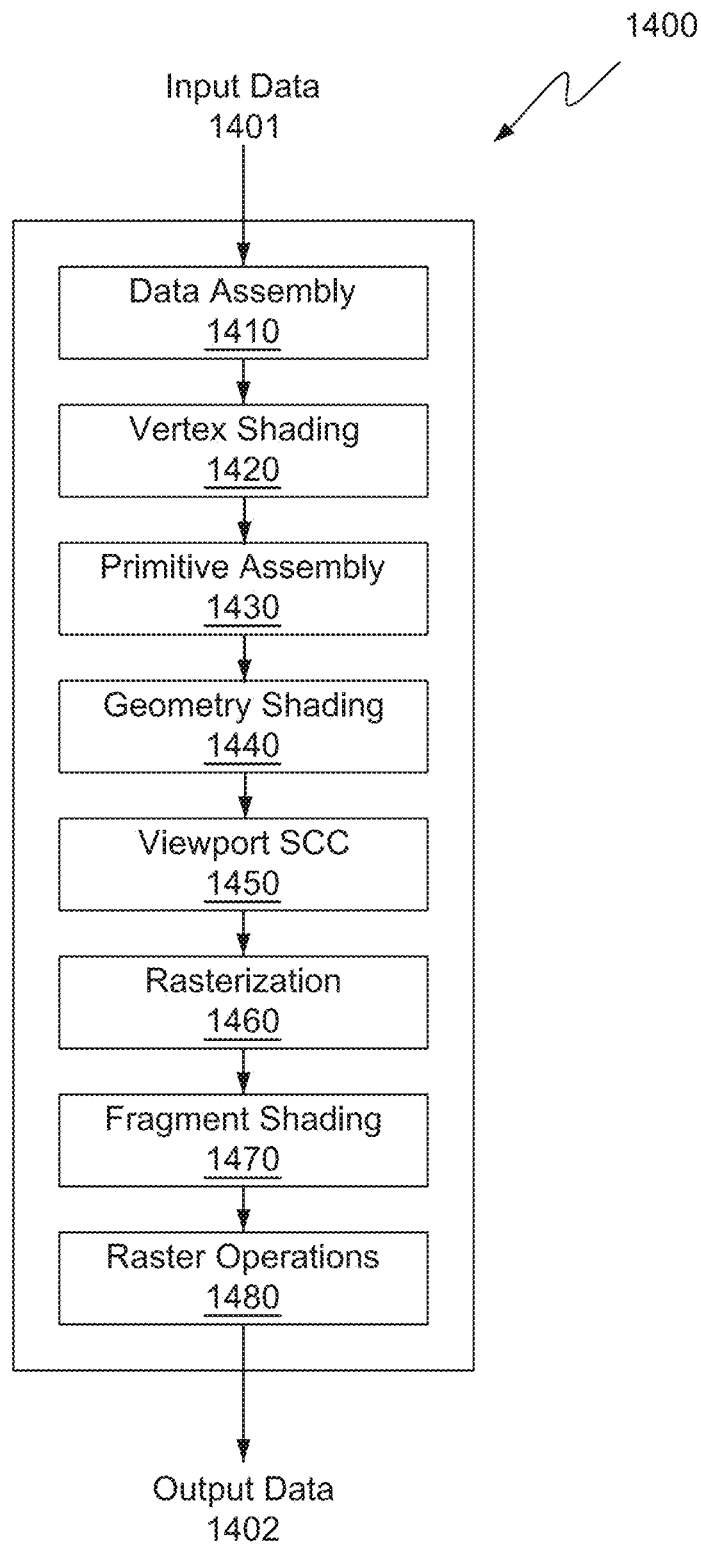
FIG. 14 is a conceptual diagram of a graphics processing pipeline implemented by the PPU of FIG. 11, in accordance with an embodiment.

FIG. 14 is a conceptual diagram of a graphics processing pipeline 1400 implemented by the PPU 1100 of FIG. 11, in accordance with an embodiment. The graphics processing pipeline 1400 is an abstract flow diagram of the processing steps implemented to generate 2D computer-generated images from 3D geometry data. As is well-known, pipeline architectures may perform long latency operations more efficiently by splitting up the operation into a plurality of stages, where the output of each stage is coupled to the input of the next successive stage. Thus, the graphics processing pipeline 1400 receives input data 1401 that is transmitted from one stage to the next stage of the graphics processing pipeline 1400 to generate output data 1402. In an embodiment, the graphics processing pipeline 1400 may represent a graphics processing pipeline defined by the OpenGL® API. As an option, the graphics processing pipeline 1400 may be implemented in the context of the functionality and architecture of the previous Figures and/or any subsequent Figure(s).

As shown in FIG. 14, the graphics processing pipeline 1400 comprises a pipeline architecture that includes a number of stages. The stages include, but are not limited to, a data assembly stage 1410, a vertex shading stage 1420, a primitive assembly stage 1430, a geometry shading stage 1440, a viewport scale, cull, and clip (VSCC) stage 1450, a rasterization stage 1460, a fragment shading stage 1470, and a raster operations stage 1480. In an embodiment, the input data 1401 comprises commands that configure the processing units to implement the stages of the graphics processing pipeline 1400 and geometric primitives (e.g., points, lines, triangles, quads, triangle strips or fans, etc.) to be processed by the stages. The output data 1402 may comprise pixel data (e.g., color data) that is copied into a frame buffer or other type of surface data structure in a memory.

The data assembly stage 1410 receives the input data 1401 that specifies vertex data for high-order surfaces, primitives, or the like. The data assembly stage 1410 collects the vertex data in a temporary storage or queue, such as by receiving a command from the host processor that includes a pointer to a buffer in memory and reading the vertex data from the buffer. The vertex data is then transmitted to the vertex shading stage 1420 for processing.

The vertex shading stage 1420 processes vertex data by performing a set of operations (e.g., a vertex shader or a program) once for each of the vertices. Vertices may be, e.g., specified as a 4-coordinate vector (e.g., <x, y, z, w>) associated with one or more vertex attributes (e.g., color, texture coordinates, surface normal, etc.). The vertex shading stage 1420 may manipulate individual vertex attributes such as position, color, texture coordinates, and the like. In other words, the vertex shading stage 1420 performs operations on the vertex coordinates or other vertex attributes associated with a vertex. Such operations commonly including lighting operations (e.g., modifying color attributes for a vertex) and transformation operations (e.g., modifying the coordinate space for a vertex). For example, vertices may be specified using coordinates in an object-coordinate space, which are transformed by multiplying the coordinates by a matrix that translates the coordinates from the object-coordinate space into a world space or a normalized-devicecoordinate (NCD) space. The vertex shading stage 1420 generates transformed vertex data that is transmitted to the primitive assembly stage 1430.

The primitive assembly stage 1430 collects vertices output by the vertex shading stage 1420 and groups the vertices into geometric primitives for processing by the geometry shading stage 1440. For example, the primitive assembly stage 1430 may be configured to group every three consecutive vertices as a geometric primitive (e.g., a triangle) for transmission to the geometry shading stage 1440. In some embodiments, specific vertices may be reused for consecutive geometric primitives (e.g., two consecutive triangles in a triangle strip may share two vertices). The primitive assembly stage 1430 transmits geometric primitives (e.g., a collection of associated vertices) to the geometry shading stage 1440.

The geometry shading stage 1440 processes geometric primitives by performing a set of operations (e.g., a geometry shader or program) on the geometric primitives. Tessellation operations may generate one or more geometric primitives from each geometric primitive. In other words, the geometry shading stage 1440 may subdivide each geometric primitive into a finer mesh of two or more geometric primitives for processing by the rest of the graphics processing pipeline 1400. The geometry shading stage 1440 transmits geometric primitives to the viewport SCC stage 1450.

In an embodiment, the graphics processing pipeline 1400 may operate within a streaming multiprocessor and the vertex shading stage 1420, the primitive assembly stage 1430, the geometry shading stage 1440, the fragment shading stage 1470, and/or hardware/software associated therewith, may sequentially perform processing operations. Once the sequential processing operations are complete, in an embodiment, the viewport SCC stage 1450 may utilize the data. In an embodiment, primitive data processed by one or more of the stages in the graphics processing pipeline 1400 may be written to a cache (e.g. L1 cache, a vertex cache, etc.). In this case, in an embodiment, the viewport SCC stage 1450 may access the data in the cache. In an embodiment, the viewport SCC stage 1450 and the rasterization stage 1460 are implemented as fixed function circuitry.

The viewport SCC stage 1450 performs viewport scaling, culling, and clipping of the geometric primitives. Each surface being rendered to is associated with an abstract camera position. The camera position represents a location of a viewer looking at the scene and defines a viewing frustum that encloses the objects of the scene. The viewing frustum may include a viewing plane, a rear plane, and four clipping planes. Any geometric primitive entirely outside of the viewing frustum may be culled (e.g., discarded) because the geometric primitive will not contribute to the final rendered scene. Any geometric primitive that is partially inside the viewing frustum and partially outside the viewing frustum may be clipped (e.g., transformed into a new geometric primitive that is enclosed within the viewing frustum. Furthermore, geometric primitives may each be scaled based on a depth of the viewing frustum. All potentially visible geometric primitives are then transmitted to the rasterization stage 1460.

The rasterization stage 1460 converts the 3D geometric primitives into 2D fragments (e.g. capable of being utilized for display, etc.). The rasterization stage 1460 may be configured to utilize the vertices of the geometric primitives to setup a set of plane equations from which various attributes can be interpolated. The rasterization stage 1460 may also compute a coverage mask for a plurality of pixels that indicates whether one or more sample locations for the pixel intercept the geometric primitive. In an embodiment, z-testing may also be performed to determine if the geometric primitive is occluded by other geometric primitives that have already been rasterized. The rasterization stage 1460 generates fragment data (e.g., interpolated vertex attributes associated with a particular sample location for each covered pixel) that are transmitted to the fragment shading stage 1470.

The fragment shading stage 1470 processes fragment data by performing a set of operations (e.g., a fragment shader or a program) on each of the fragments. The fragment shading stage 1470 may generate pixel data (e.g., color values) for the fragment such as by performing lighting operations or sampling texture maps using interpolated texture coordinates for the fragment. The fragment shading stage 1470 generates pixel data that is transmitted to the raster operations stage 1480.

The raster operations stage 1480 may perform various operations on the pixel data such as performing alpha tests, stencil tests, and blending the pixel data with other pixel data corresponding to other fragments associated with the pixel. When the raster operations stage 1480 has finished processing the pixel data (e.g., the output data 1402), the pixel data may be written to a render target such as a frame buffer, a color buffer, or the like.

It will be appreciated that one or more additional stages may be included in the graphics processing pipeline 1400 in addition to or in lieu of one or more of the stages described above. Various implementations of the abstract graphics processing pipeline may implement different stages. Furthermore, one or more of the stages described above may be excluded from the graphics processing pipeline in some embodiments (such as the geometry shading stage 1440). Other types of graphics processing pipelines are contemplated as being within the scope of the present disclosure. Furthermore, any of the stages of the graphics processing pipeline 1400 may be implemented by one or more dedicated hardware units within a graphics processor such as PPU 1100. Other stages of the graphics processing pipeline 1400 may be implemented by programmable hardware units such as the SM 1240 of the PPU 1100.

The graphics processing pipeline 1400 may be implemented via an application executed by a host processor, such as a CPU. In an embodiment, a device driver may implement an application programming interface (API) that defines various functions that can be utilized by an application in order to generate graphical data for display. The device driver is a software program that includes a plurality of instructions that control the operation of the PPU 1100. The API provides an abstraction for a programmer that lets a programmer utilize specialized graphics hardware, such as the PPU 1100, to generate the graphical data without requiring the programmer to utilize the specific instruction set for the PPU 1100. The application may include an API call that is routed to the device driver for the PPU 1100. The device driver interprets the API call and performs various operations to respond to the API call. In some instances, the device driver may perform operations by executing instructions on the CPU. In other instances, the device driver may perform operations, at least in part, by launching operations on the PPU 1100 utilizing an input/output interface between the CPU and the PPU 1100. In an embodiment, the device driver is configured to implement the graphics processing pipeline 1400 utilizing the hardware of the PPU 1100.

Various programs may be executed within the PPU 1100 in order to implement the various stages of the graphics processing pipeline 1400. For example, the device driver may launch a kernel on the PPU 1100 to perform the vertex shading stage 1420 on one SM 1240 (or multiple SMs 1240). The device driver (or the initial kernel executed by the PPU 1200) may also launch other kernels on the PPU 1200 to perform other stages of the graphics processing pipeline 1400, such as the geometry shading stage 1440 and the fragment shading stage 1470. In addition, some of the stages of the graphics processing pipeline 1400 may be implemented on fixed unit hardware such as a rasterizer or a data assembler implemented within the PPU 1200. It will be appreciated that results from one kernel may be processed by one or more intervening fixed function hardware units before being processed by a subsequent kernel on an SM 1240.

Machine Learning

Deep neural networks (DNNs) developed on processors, such as the PPU 1100 have been used for diverse use cases, from self-driving cars to faster drug development, from automatic image captioning in online image databases to smart real-time language translation in video chat applications. Deep learning is a technique that models the neural learning process of the human brain, continually learning, continually getting smarter, and delivering more accurate results more quickly over time. A child is initially taught by an adult to correctly identify and classify various shapes, eventually being able to identify shapes without any coaching. Similarly, a deep learning or neural learning system needs to be trained in object recognition and classification for it get smarter and more efficient at identifying basic objects, occluded objects, etc., while also assigning context to objects.

At the simplest level, neurons in the human brain look at various inputs that are received, importance levels are assigned to each of these inputs, and output is passed on to other neurons to act upon. An artificial neuron or perceptron is the most basic model of a neural network. In one example, a perceptron may receive one or more inputs that represent various features of an object that the perceptron is being trained to recognize and classify, and each of these features is assigned a certain weight based on the importance of that feature in defining the shape of an object.

A deep neural network (DNN) model includes multiple layers of many connected nodes (e.g., perceptrons, Boltzmann machines, radial basis functions, convolutional layers, etc.) that can be trained with enormous amounts of input data to quickly solve complex problems with high accuracy. In one example, a first layer of the DNN model breaks down an input image of an automobile into various sections and looks for basic patterns such as lines and angles. The second layer assembles the lines to look for higher level patterns such as wheels, windshields, and mirrors. The next layer identifies the type of vehicle, and the final few layers generate a label for the input image, identifying the model of a specific automobile brand.

Once the DNN is trained, the DNN can be deployed and used to identify and classify objects or patterns in a process known as inference. Examples of inference (the process through which a DNN extracts useful information from a given input) include identifying handwritten numbers on checks deposited into ATM machines, identifying images of friends in photos, delivering movie recommendations to over fifty million users, identifying and classifying different types of automobiles, pedestrians, and road hazards in driverless cars, or translating human speech in real-time.

During training, data flows through the DNN in a forward propagation phase until a prediction is produced that indicates a label corresponding to the input. If the neural network does not correctly label the input, then errors between the correct label and the predicted label are analyzed, and the weights are adjusted for each feature during a backward propagation phase until the DNN correctly labels the input and other inputs in a training dataset. Training complex neural networks requires massive amounts of parallel computing performance, including floating-point multiplications and additions that are supported by the PPU 1100. Inferencing is less compute-intensive than training, being a latency-sensitive process where a trained neural network is applied to new inputs it has not seen before to classify images, translate speech, and generally infer new information.

Neural networks rely heavily on matrix math operations, and complex multi-layered networks require tremendous amounts of floating-point performance and bandwidth for both efficiency and speed. With thousands of processing cores, optimized for matrix math operations, and delivering tens to hundreds of TFLOPS of performance, the PPU 1100 is a computing platform capable of delivering performance required for deep neural network-based artificial intelligence and machine learning applications.

Other Embodiments

Example embodiments were described above in relation primarily to computer systems with interactive inputs and/or display events. As noted before, however, embodiments are not limited to such systems. According to another example embodiments, an SoC includes at least one GPU which has core off with fast exit sleep mode capabilities. A key aspect of many embodiments is that the low power state can be entered and exited in an autonomous manner or in a mode based manner. In the autonomous manner, the algorithm running on the GPU could take the decision to enter and exit modes. In scenarios where the embodiment is in use in an autonomous vehicle or the like, a mode based approach where entry and exit are managed by the CPU on the SoC may be more preferred.

The example SoC may include, on a single chip, one or more CPUs, at least one GPU which has core off with fast exit capabilities, one or more memories, and one or more data links interconnecting the CPUs, GPUs, memories, other components on the chip, and one or more interfaces to display, storage and/or input/output devices. The CPUs, GPUs, memories and data links on the SoC may be of the same types as that described in relation to FIG. 1 above. According to the example embodiment, the SoC may be put in a sleep mode in which a GPU has its core(s) powered off while one or more communications links connecting that GPU to other components remains powered on as described in relation to FIGS. 1 and 3-10 above. The example SoC may be deployed in various computing environments, and may be used in applications that drive displays, perform various control operations, perform other input/output, and/or perform computations.

The example SoC may be deployed in an autonomous vehicle as a primary or backup controller to control the vehicle in real-time based on inputs received from multiple sources such as cameras, lidar, radar, ultrasonic sensors, GPS, speed sensors, inertial sensors, vehicle subsystems (e.g., braking subsystem, steering subsystem, propulsion subsystem, etc.). The SoC may use deep neural networks on one or more GPUs in the SoC to process sensor data and other inputs to generate commands to control the various subsystems of the vehicle during automated driving.

The example SoC may enter into core off with fast exit sleep mode according to embodiments when the vehicle's current state results in a slowdown of the sensor input to be processed in the neural networks and driving control actions to be taken. Certain changes in the operational conditions of the vehicle, such as, for example, slowing of the vehicle's moving speed, a pause in the movement of the vehicle (e.g., stopping at a stop light), the vehicle entering a less crowded environment (e.g., a highway or freeway) from a crowded urban environment, etc., may reduce the real-time workload (e.g., reduced amount of incoming sensor data or reduced variation in incoming sensor data) and thereby provide opportunities for the SoC to invoke low power states on one or more of its processors (e.g., a CPU or GPU) at least for short time intervals (e.g., in intervals of less than 10 ms, 20 ms, 30 ms) in order to reduce consumption of battery power and provide power in proportion to the computation required. For example, upon detection of such a change in an operational condition, the SoC may put a GPU in the sleep mode. The fast exit capability of the described sleep mode enables the SoC to be put in the sleep mode even for short duration situations not existing 10, 20 or 30 ms, whilst providing fast response when a request is made to exit to functional state. A CPU in the SoC may manage the trigger entry and exit from the sleep mode.

In the context of an autonomous vehicle, the cycle from power on to power off and back to power on should take less time than is needed for the neural network to acquire data and/or make decisions in real time which are typically at intervals of a frame boundary. For example, if the sensors used to acquire real time data concerning the vehicle's environment report new data every certain time period, and the neural network(s) that analyze this reported data can perform analysis and corresponding decision making based on the new data in less than the certain time period, then the processor(s) executing the neural network can go to a low power mode for the remainder of the certain time period and transition to a power on mode in time to receive the next reported data. Different cycles can have different timing. For example, if the new data reported by the sensors does not require extensive analysis or decision making, then the neural network's tasks with respect to such data is over and the system is free to power down the processor(s) until the next time new data is expected. On the other hand, if the new data requires further analysis or decision making (for example, the new data is image data that shows an obstruction has entered the view of the LIDAR, RADAR or optical sensor view), it may be desirable to keep the processor(s) running the neural network(s) powered on to analyze the new data. In this context, the processing system controls (e.g., in a mode based approach) the durations of power-down scenarios so they do not interfere with real time processing of input data and associated decision making.

In addition to the above described autonomous vehicle applications, SoC's according to embodiments can also be used in other applications such as robots, household and/or factory appliances, computing servers and the like, in a manner where the emphasis is on energy proportional computing in fixed charge environments (e.g., battery).

Whenever it is described in this document that a given item is present in "some embodiments," "various embodiments," "certain embodiments," "certain example embodiments, "some example embodiments," "an exemplary embodiment," or whenever any other similar language is used, it should be understood that the given item is present in at least one embodiment, though is not necessarily present in all embodiments. When it is described in this document that an action "may," "can," or "could" be performed, that a feature or component "may," "can," or "could" be included in or is applicable to a given context, that a given item "may," "can," or "could" possess a given attribute, or whenever any similar phrase involving the term "may," "can," or "could" is used, it should be understood that the given action, feature, component, attribute, etc. is present in at least one embodiment, though is not necessarily present in all embodiments. Terms and phrases used in this document, and variations thereof, unless otherwise expressly stated, should be construed as open-ended rather than limiting. As examples of the foregoing: "and/or" includes any and all combinations of one or more of the associated listed items (e.g., a and/or b means a, b, or a and b); the singular forms "a", "an" and "the" should be read as meaning "at least one," "one or more," or the like; the term "example" is used provide examples of the subject under discussion, not an exhaustive or limiting list thereof; the terms "comprise" and "include" (and other conjugations and other variations thereof) specify the presence of the associated listed items but do not preclude the presence or addition of one or more other items; and if an item is described as "optional," such description should not be understood to indicate that other items are also not optional.

While the invention has been described in connection with what is presently considered to be the most practical and preferred embodiments, it is to be understood that the invention is not to be limited to the disclosed embodiments. As an example, while the discussion above has been presented using certain hardware as an example, any type or number of processor(s) can be used. On the contrary, is intended to cover various modifications and equivalent arrangements included within the spirit and scope of the appended claims.

The invention claimed is:

1. A computer system, comprising:
   a processor configured to execute instructions at least in part in response to user input; and
   a graphics processor comprising a plurality of processing cores configured to generate images at least in part in response to the executing instructions and the user input, an internal interface connecting the plurality of processing cores, an always-on circuit configured to remain powered when the computer system receives power, and at least one data link interface that is separate from the always-on circuit and that is configured to connect to one or more devices external to the graphics processor,
   wherein the internal interface is in a first power domain, the always-on circuit is in a second power domain, and the at least one data link interface is in a third power domain, and
   wherein the graphics processor includes a power management circuit that is connected to the always-on circuit and that is configured to separately control the first power domain and the third power domain to repetitively transition, transparently to a user viewing the generated images while the always-on circuit is powered and while said instructions are executing, to and from a low power mode in which the plurality of processing cores and the internal interface are unpowered while the at least one data link interface remains powered.

2. The computer system according to claim 1, wherein the plurality of processing cores, in a time interval including a period in which the graphics processor is in the low power mode, renders successive ones of said images for display such that a time interval between two successive images is less than a threshold time of human perception of interactivity.

3. The computer system according to claim 2, wherein said time interval between two successive images is less than 30 milliseconds.

4. The computer system according to claim 3, wherein said time interval between two successive images is less than 10 milliseconds.

5. The computer system according to claim 1, wherein the transition occurs in less than 30 milliseconds.

6. The computer system according to claim 5, wherein the transition occurs in less than 10 milliseconds.

7. The computer system according to claim 1, wherein the graphic processor is further configured to put the at least one data link interface in a reduced power quiescent link power mode for the low power mode and a full power active link power mode for a full operational mode.

8. The computer system according to claim 7, wherein state associated with the at least one data link interface is stored before the plurality of processing cores is powered off and is retained during the low power mode.

9. The computer system according to claim 8, wherein a state of the plurality of processing cores is stored before the plurality of processing cores is powered off and is preserved during the low power mode in a frame buffer memory connected to the graphics processor.

10. The computer system according to claim 1, wherein the graphics processor includes a first power rail configured to supply power to the internal interface, a second power rail configured to supply power to the always-on circuit, and a third power rail configured to supply power to the at least one data link interface, and wherein, in the low power mode, the third power rail powers the at least one data interface and the first power rail is unpowered and, in the full power mode, the first power rail and the third power rail are each powered.

11. The computer system according to claim 1, wherein the graphics processor further includes one or more clamp circuits at one or more crossings between a core power domain that includes one or more of the plurality of processing cores and a link power domain that includes one or more of the at least one data link interface, wherein each of the one or more clamp circuits is configured to retain a signal as part of a link state of one or the at least one data link interface.

12. The computer system according to claim 11, wherein the one or more clamp circuits are configured to, when transitioning from the full power mode to the low power mode, enable latching before enabling clamping and releasing the latching after releasing the clamping.

13. The computer system according to claim 12, wherein the power management circuit is configured to reset the core power domain upon wakeup from the low power mode, without affecting the link state retained from before the low power mode was entered.

14. A processor comprising a plurality of processing cores, an internal interface connecting the plurality of processing cores, an always-on circuit configured to remain powered when a device including the processor is powered, and at least one data link interface that is separate from the always-on circuit is configured to connect to one or more devices external to the processor, wherein the internal interface is in a first power domain, the always-on circuit is in a second power domain, and the at least one data link interface is in a third power domain, and wherein the processor is operable, while the always-on circuit is powered on, to repeatedly transition, transparently to a user viewing generated images, between a low power mode in which the first power domain and the third power domain are separately controlled such that one of the plurality of processing cores and the internal interface are unpowered and the at least one data link interface is powered on and a full power mode in which the first power domain and the third power domain are separately controlled such that the plurality of processing cores and the internal interface are powered.

15. The processor according to claim 14, wherein all processing cores of the processor are powered off in the low power mode.

16. The processor according to claim 15, wherein the at least one data link interface is in a reduced power quiescent link power mode during the low power mode.

17. The processor according to claim 14, wherein the processor is a graphics processing unit (GPU) and each of the plurality of processing cores is a graphics processing core.

18. The processor according to claim 14, wherein a frame buffer input/output (FBIO) interface which connects the processor to a frame buffer remains powered on in the low power mode.

19. The processor according to claim 18, wherein a state of the plurality of processing cores is written to the frame buffer input/output interface for storing in the frame buffer before the processor enters the low power mode.

20. The processor according to claim 18, further comprising a general purpose input/output (GPIO) interface connected to the always-on circuit, wherein the always-on circuit remains powered on during the low power mode and includes wake logic for exiting the processor from the low power mode.

21. The processor according to claim 14, further comprising a display interface connectable to a display, wherein the processor is configured to (1) render a first image to the display via the display interface while the processor is in a full power operational mode in which the plurality of processing cores and the data link interfaces are powered on, (2) enter the low power mode after the rendering while the first image continues to be displayed on the display, (3) exit the low power mode in less than a threshold time, and (4) render a second image to the display via the display interface from a subsequently entered said full power operational mode such that the entered low power mode is transparent to a user viewing the first and second images.

22. The processor according to claim 21, wherein the threshold time is 30 ms.

23. The processor according to claim 14, further comprising a power management unit that is configured to remain powered on during the low power mode.

24. The processor according to claim 14, wherein the at least one data link interface is configured to connect the processor to at least one of a peer GPU, a central processing unit (CPU), or a PCI Express (PCIE) root port.

25. The processor according to claim 14, wherein the at least one data link interface includes a PCIE interface or a NVLINK interface.

26. The processor according to claim 14, further including a clamping circuit to preserve link states of the at least one data link interface.

27. The processor according to claim 26, further including a latching circuit to preserve the link states corresponding to a state before the plurality of processing cores are powered off.

28. The processor according to claim 27, further including a reset control to reset portions of circuitry without affecting said link states.

29. The processor according to claim 28, wherein the reset control is further configured to enable transfer of memory repair information into one or more memory modules before resetting one or more said portions of circuitry.

30. The processor according to claim 28, wherein the internal interface in in a first power domain, the always-on circuit is in a second power domains, and the clamping circuit is maintained in a same third power domain as the at least one data link interface.

31. The processor according to claim 14, further including logic to transition from the low power mode to a full power operational mode upon detecting a signal from a CPU or an external interface.

32. The processor according to claim 31, further comprising a controller configured to control the signal to a general purpose input/output request provided to the GPU.

33. The processor according to claim 14, wherein the first power domain comprises at least a first power subdomain and a second power subdomain, wherein, in the low power mode, the first power subdomain comprising the one of the plurality of processing cores is powered down and the second power domain comprising another one of the plurality of processing cores is powered on.

34. A method comprising:
- detecting an idle processing state in a processor that comprises a plurality of processing cores, an internal interface connecting the plurality of processing cores, an always-on circuit configured to remain powered when a device including the processor is powered, and at least one data link interface that is separate from the always-on circuit and that is configured to connect to one or more devices external to the processor, wherein the internal interface is in a first power domain, the always-on circuit is in a second power domain, and the at least one data link interface is in a third power domain;
- in response to the detecting, while the always-on circuit is powered on separately controlling the first power domain and the third power domain to enter the processor into a low power mode in which power is off to one processing core of the plurality of processing cores and the internal interface, and power is on to the at least one data link interface;
- in response to a wake signal, causing the always-on circuit to initiate entering the processor into a full power mode in which power is on to the plurality of processing cores, the internal interface and the at least one data link interface; and
- separately controlling the first power domain and the third power domain to repetitively transition, transparently to a user viewing images generated on the processor, to and from the low power mode.

35. A system on a chip (SoC), comprising:
- a central processing unit (CPU);
- at least one data link coupled to the CPU; and
- a graphics processing unit (GPU) comprising a plurality of processing cores, an internal interface connecting the plurality of processing cores, an always-on circuit configured to remain powered when the SoC receives power, and at least one data link interface that is separate from the always-on circuit and that is configured for communicating over the at least one data link, wherein the internal interface is in a first power domain, the always-on circuit is in a second power domain, and the at least one data link interface is in a third power domain, and wherein the GPU is operable, while the always-on circuit is powered on, to repetitively transition, transparently to a user viewing images generated on the GPU, between in a low power mode in which the first power domain and the third power domain are separately controlled such that the plurality of processing cores and the internal interface are unpowered and the at least one data link interface is powered on and a full power mode in which the first power domain and the third power domain are separately controlled such that the plurality of processing cores and the internal interface are powered.

* * * * *